United States Patent
Ito et al.

(10) Patent No.: US 10,602,659 B2
(45) Date of Patent: *Mar. 31, 2020

(54) LAWN MOWER WITH INDEPENDENT BLADE CONTROL DURING ENERGY-SAVING CONTROL MODE

(71) Applicant: KUBOTA CORPORATION, Osaka (JP)

(72) Inventors: Hirokazu Ito, Osaka (JP); Kazuo Koike, Hyogo (JP); Yoshitomo Fujimoto, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/440,904

(22) Filed: Feb. 23, 2017

(65) Prior Publication Data
US 2017/0156261 A1 Jun. 8, 2017

Related U.S. Application Data

(63) Continuation of application No. 14/483,416, filed on Sep. 11, 2014, now Pat. No. 9,615,508.

(30) Foreign Application Priority Data

Jan. 20, 2014 (JP) ................... 2014-008152

(51) Int. Cl.
*A01D 34/00* (2006.01)
*A01D 34/58* (2006.01)
(Continued)

(52) U.S. Cl.
CPC ......... *A01D 34/006* (2013.01); *A01D 34/008* (2013.01); *A01D 34/58* (2013.01);
(Continued)

(58) Field of Classification Search
CPC ........ A01D 33/02; A01D 33/08; A01D 46/02; A01D 34/006; A01D 34/78; A01D 34/58;
(Continued)

(56) References Cited

U.S. PATENT DOCUMENTS 5,937,622 A 8/1999 Carrier et al.
6,269,617 B1 8/2001 Blanchard
(Continued)

FOREIGN PATENT DOCUMENTS

JP 2011-142842 7/2011
JP 2012-187025 10/2012
(Continued)

*Primary Examiner* — Alicia Torres
(74) *Attorney, Agent, or Firm* — Greenblum & Bernstein, P.L.C

(57) ABSTRACT

A lawn mower includes: a mower unit having a plurality of blades for performing lawn mowing work, the plurality of blades being driven by rotational power, a blade motor configured to transmit rotational power to each of the plurality of blades, and be capable of optionally changing the rotation number of the rotational power transmitted to each of the plurality of blades; and a controller configured to detect respective speeds of the plurality of blades to the ground and perform energy-saving control of increasing and decreasing the rotation number of the rotational power transmitted to each of the plurality of blades in accordance with increase and reduction in the detected speed of each of the plurality of blades.

15 Claims, 17 Drawing Sheets

(51) Int. Cl.
  *A01D 34/78* (2006.01)
  *A01D 69/02* (2006.01)
  *A01D 34/66* (2006.01)
  *A01D 34/76* (2006.01)
  *A01D 101/00* (2006.01)

(52) U.S. Cl.
  CPC .............. *A01D 34/66* (2013.01); *A01D 34/76* (2013.01); *A01D 34/78* (2013.01); *A01D 69/02* (2013.01); *A01D 2101/00* (2013.01)

(58) Field of Classification Search
  CPC ...... A01D 34/73; A01D 34/008; A01D 34/63; A01D 69/02; A01G 17/026; B60L 2200/40
  See application file for complete search history.

(56) References Cited

U.S. PATENT DOCUMENTS

| | | | |
|---|---|---|---|
| 7,007,446 B2 | 3/2006 | Dettmann | |
| 7,168,227 B2 | 1/2007 | Derby et al. | |
| 7,610,738 B2 | 11/2009 | Daly et al. | |
| 9,615,508 B2 | 4/2017 | Ito | |
| 2005/0257508 A1* | 11/2005 | Modzik | A01D 34/44 56/7 |
| 2007/0107400 A1 | 5/2007 | Derby et al. | |
| 2012/0111655 A1* | 5/2012 | Ebihara | A01D 34/74 180/69.6 |
| 2012/0227368 A1 | 9/2012 | Koike | |
| 2012/0227369 A1* | 9/2012 | Koike | A01D 69/02 56/10.2 A |
| 2012/0265391 A1 | 10/2012 | Letsky | |
| 2013/0047565 A1 | 2/2013 | Shida | |
| 2013/0212995 A1 | 8/2013 | Ebihara | |
| 2013/0268165 A1 | 10/2013 | Hashima | |
| 2013/0282224 A1* | 10/2013 | Yazaki | A01D 34/008 701/24 |
| 2014/0059990 A1 | 3/2014 | Fujiwara | |

FOREIGN PATENT DOCUMENTS

| | | |
|---|---|---|
| JP | 2013-188161 | 9/2013 |
| JP | 2013-253510 | 12/2013 |

* cited by examiner

LAWN MOWER WITH INDEPENDENT BLADE CONTROL DURING ENERGY-SAVING CONTROL MODE

CROSS-REFERENCE TO RELATED APPLICATIONS

The instant application is a Continuation of U.S. non-provisional application Ser. No. 14/483,416 filed on Sep. 11, 2014, which application claims priority under 35 U.S.C. § 119 of Japanese Application No. 2014-008152, filed on Jan. 20, 2014. The disclosure of each application is herein expressly incorporated by reference in its entirety.

TECHNICAL FIELD

The disclosure relates to a technology of a lawn mower including a work device having a plurality of blades for performing lawn mowing work.

BACKGROUND ART

Heretofore, there is publicly known a technology of a lawn mower including a work device having a plurality of blades for performing lawn mowing work, for example, as disclosed in JP 2013-253510 A.

JP 2013-253510 A discloses a lawn mower including a mower unit that serves as a work device. The mower unit has a plurality of blades. In a case where it is detected that power from an engine is transmitted to the mower unit, the lawn mower can control the engine by isochronous control.

Thus, in a case where power is transmitted to the mower unit, it is determined that the mower unit is in the course of lawn mowing work, and the engine is controlled by isochronous control. Consequently, even when a load applied to the engine is fluctuated, an engine rotational speed can be maintained constant, and the rotation numbers of the plurality of blades can be also maintained constant.

However, in the lawn mower disclosed in JP 2013-253510 A, the plurality of blades are driven through a single belt (belt transmission mechanism), and therefore the plurality of blades rotate at the same rotation number. Accordingly, the lawn mower has room for improvement in energy saving performance. Hereinafter, specific description is made.

Generally, the plurality of blades are disposed side by side in a left and right direction. Therefore, when the lawn mower turns left and right, the speeds of the plurality of blades to the ground are different from each other. Specifically, the speed of a blade disposed on an inner side in a turning direction (hereinafter, simply described as an "inner blade") is smaller (slower) than the speed of a blade disposed on an outer side in the turning direction (hereinafter, simply described as an "outer blade"). In this case, even when the rotation number of the inner blade is made smaller than the rotation number of the outer blade, it is possible to perform work (lawn mowing work) with respect to the ground with accuracy equal to the outer blade. Therefore, a conventional technology of rotating a plurality of blades at the same rotation number includes inefficient work and has room for improvement in energy saving performance.

SUMMARY OF INVENTION

In view of the above circumstances, an object of the disclosure is to provide a lawn mower capable of improving energy saving performance.

The problem to be solved by the disclosure has been described above, and means for solving the problem is now described.

That is, a lawn mower according to the disclosure includes: a work device having a plurality of blades for performing lawn mowing work, the plurality of blades being driven by rotational power, a power device configured to transmit rotational power to each of the plurality of blades, and be capable of optionally changing the rotation number of the rotational power transmitted to each of the plurality of blades; a blade speed detection unit configured to detect respective speeds of the plurality of blades to a ground; and a control device configured to perform energy-saving control of increasing and decreasing the rotation number of the rotational power transmitted to each of the plurality of blades in accordance with increase and reduction in the detected speed of each of the plurality of blades.

As effects of the disclosure, the following effects are obtained.

In the lawn mower according to the disclosure, the rotation number of the rotational power transmitted to each of the blades is increased and decreased in accordance with increase and reduction in the speed of each of the plurality of blades to the ground, so that excessive rotational power can be prevented from being transmitted to the blades, and energy saving performance can be improved. Particularly, in a case where the speeds of the respective blades are different, the rotation number of the rotational power transmitted to each of the blades can be individually increased and decreased, and energy saving performance can be effectively improved.

DESCRIPTION OF EMBODIMENTS

Figure 1:
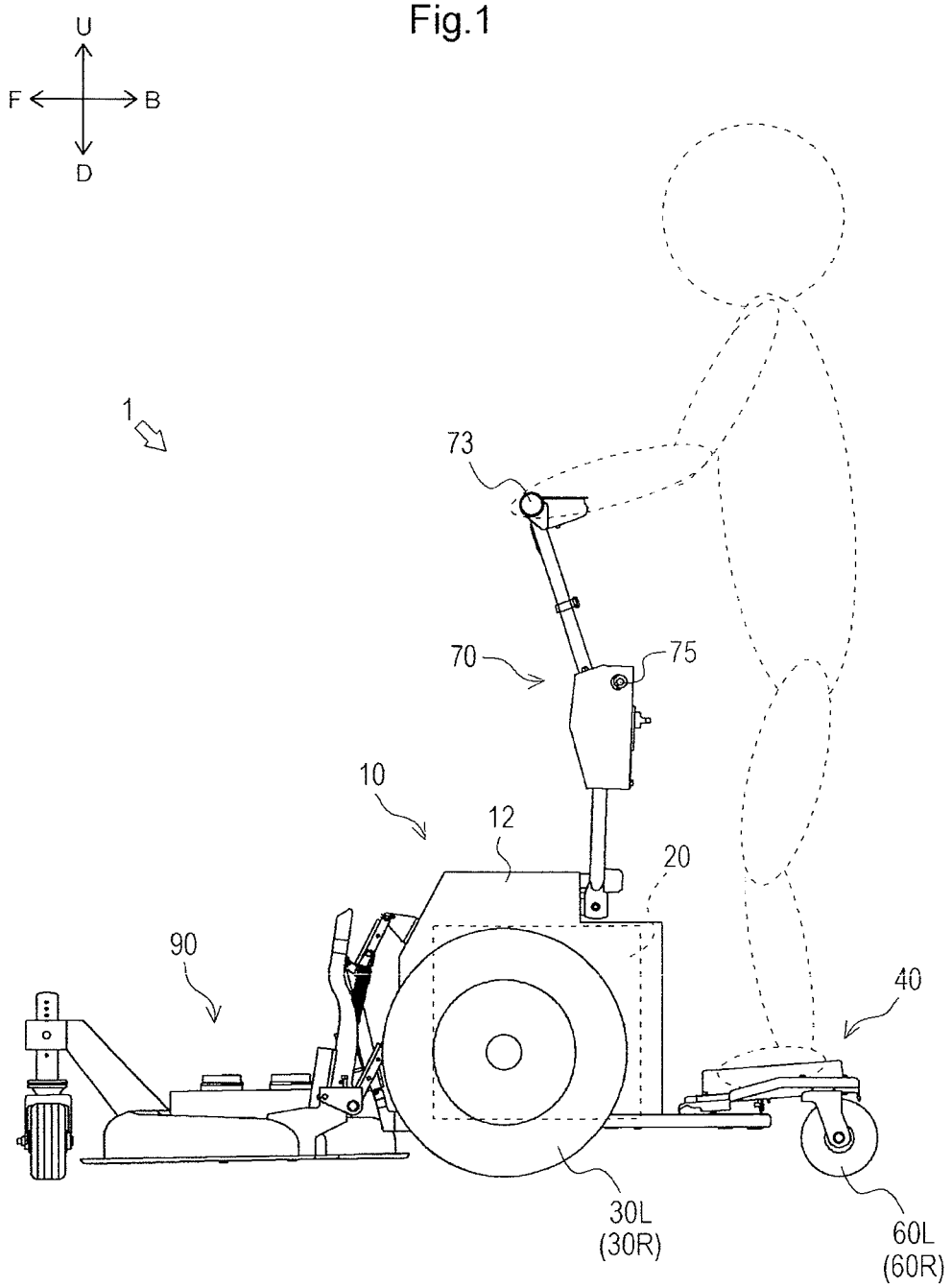
FIG. 1 is a side view showing a situation where a worker rides on a lawn mower according to an embodiment of the disclosure.

Hereinafter, the direction of an arrow U, the direction of an arrow D, the direction of an arrow L, the direction of an arrow R, the direction of an arrow F, and the direction of an arrow B shown in the drawings are defined as an upper direction, a lower direction, a left direction, a right direction, a front direction, and a back direction, respectively, and description is made.

Hereinafter, an entire configuration of a lawn mower 1 according to an embodiment (first embodiment) of the disclosure is described with reference to FIG. 1 to FIG. 5.

The lawn mower 1, on which a worker rides, travels, and enables the worker to perform predetermined work to the ground (lawn mowing work). The lawn mower 1 mainly includes a traveling machine body 10, a motive power part 20, a driving wheel 30L and a driving wheel 30R, a riding part 40, a driven wheel 60L and a driven wheel 60R, a handle 70, and a mower unit 90.

The traveling machine body 10 is supported by a pair of the left and right driving wheels 30L and 30R. The traveling machine body 10 is provided with the motive power part 20 for driving the pair of left and right driving wheels 30L and 30R. To the back part of the traveling machine body 10, the riding part 40 on which the worker rides is connected. In both the left and right ends of the riding part 40, the driven wheel 60L and the driven wheel 60R are provided respectively. To the upper part of the traveling machine body 10, the handle 70 is connected, and is provided so as to extend upward. To the front part of the traveling machine body 10, the mower unit 90 that is a work device for grass mowing (particularly, lawn mowing) is connected.

In the lawn mower 1 thus configured, the worker rides on the riding part 40 to grip the handle 70 by a hand, so that the worker can stably ride on the lawn mower 1. Additionally, the worker performs predetermined operation, so that the worker can independently drive the pair of left and right driving wheels 30L and 30R to enable the lawn mower 1 to travel arbitrarily. That is, while arbitrarily steering the lawn mower 1 left and right, the worker can move the lawn mower 1 forward or backward, and turn the lawn mower 1 on the spot. Furthermore, the worker performs predetermined operation, so that the worker drives the mower unit 90 to enable lawn mowing work.

Hereinafter, a configuration of each part of the lawn mower 1 is described.

The traveling machine body 10 shown in FIG. 1 to FIG. 7 mainly includes a machine body frame 11, and a machine body cover 12.

The machine body frame 11 shown in FIG. 4 to FIG. 7 serves as a main structure of the traveling machine body 10. The machine body frame 11 is formed by combining a plurality of cylindrical members which are properly bent, or plate-shaped members. A space surrounded by the machine body frame 11 is a housing space S for housing component members of the motive power part 20 described later.

Figure 2:
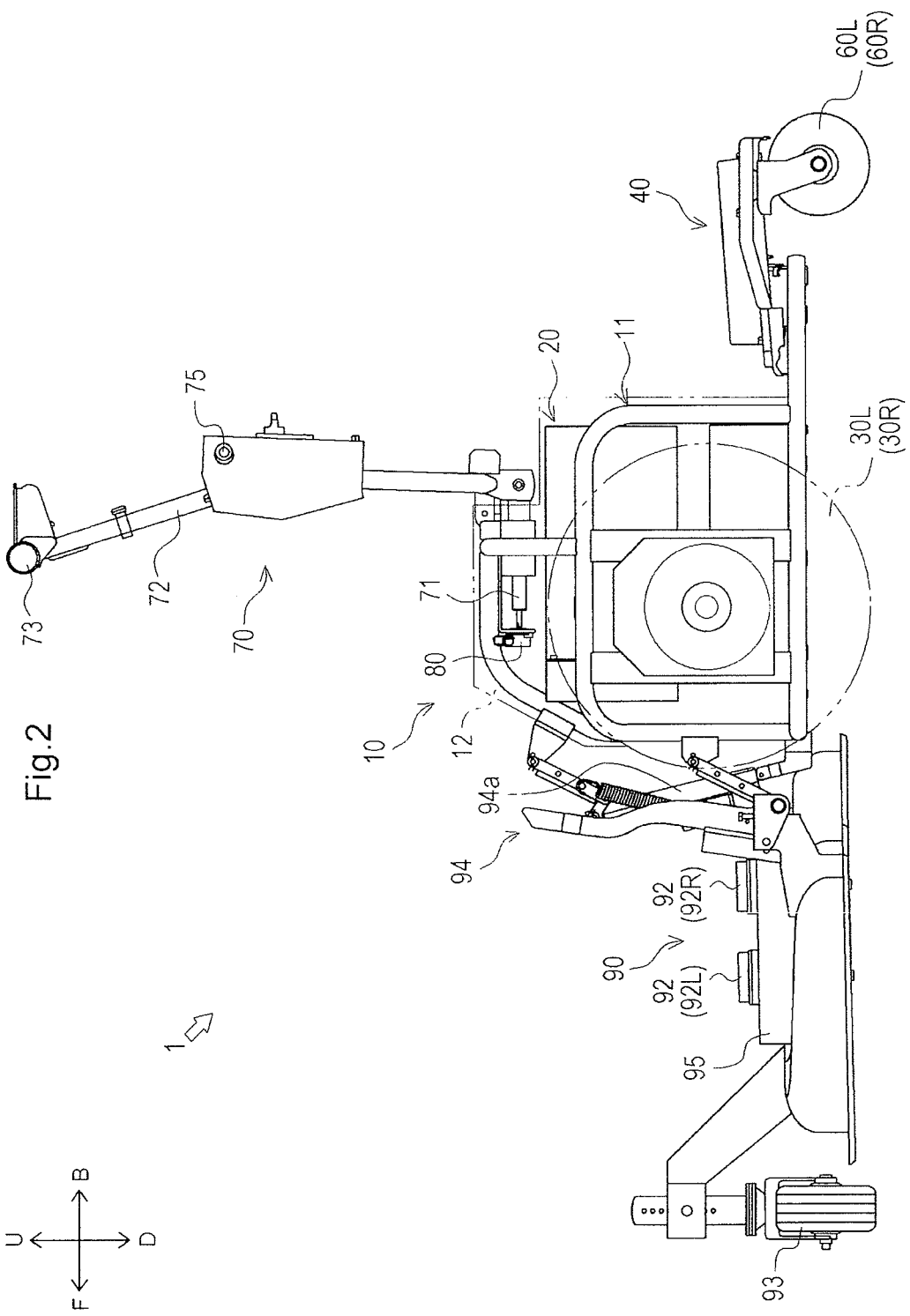
FIG. 2 is side view of the lawn mower of this embodiment.

The machine body cover 12 shown in FIG. 1 and FIG. 2 is fixed to the machine body frame 11 so as to cover the housing space S of the machine body frame 11. The machine body cover 12 can conceals the machine body frame 11 or a device provided in the machine body frame 11 (motive power part 20 described later).

The motive power part 20 shown in FIG. 4 to FIG. 7 generates power for driving the driving wheel 30L and the driving wheel 30R, and transmits the power to the driving wheel 30L and the driving wheel 30R. The motive power part 20 mainly includes a battery 21, a left motor 22L and a right motor 22R, a left power transmission mechanism 23L and a right power transmission mechanism 23R, and a controller box 24.

The battery 21 stores electric power for driving the lawn mower 1. The battery 21 is disposed in the lower part of the housing space S so as to range from the front end to the rear end of the housing space S.

The left motor 22L and the right motor 22R are power sources for independently driving the pair of left and right driving wheels 30L and 30R, respectively. The left motor 22L and the right motor 22R can generate rotational power by using supplied electric power. The left motor 22L and the right motor 22R are disposed side by side in the left and right direction inside the housing space S, respectively. The left motor 22L and the right motor 22R are disposed on substantially the central part in the front and back direction of the housing space S right above the battery 21.

The left power transmission mechanism 23L and the right power transmission mechanism 23R properly decelerate power from the left motor 22L and the right motor 22R, and thereafter transmit the decelerated power to the pair of left and right driving wheels 30L and 30R. The left power transmission mechanism 23L is connected to the left motor 22L to be fixed to the left side surface of the machine body frame 11. The right power transmission mechanism 23R is connected to the right motor 22R to be fixed to the right side surface of the machine body frame 11. The left power transmission mechanism 23L has an axle (output shaft) that is connected to the driving wheel 30L, and the right power transmission mechanism 23R has an axle that is connected to the driving wheel 30R. The axle of the left power transmission mechanism 23L and the axle of the right power transmission mechanism 23R are disposed on the same axis, and therefore the pair of left and right driving wheels 30L and 30R are disposed on the same axis.

The controller box 24 houses devices for controlling the driving of the lawn mower 1 (specifically, a controller 24a, a left inverter 24b, a right inverter 24c, a left working inverter 24d, a right working inverter 24e, and the like which are described later). The controller box 24 is disposed in the upper part of the housing space S so as to range from the front to the back of the left motor 22L and the right motor 22R through the upper parts.

The controller 24a and the like housed in the controller box 24 are described later.

The driving wheel 30L and the driving wheel 30R support the traveling machine body 10, and rotate to allow the traveling machine body 10 to travel. The driving wheel 30L and the driving wheel 30R support the traveling machine body 10 through the motive power part 20 (the left power transmission mechanism 23L and the right power transmission mechanism 23R).

The riding part 40 shown in FIG. 6 to FIG. 9 is disposed behind the traveling machine body 10, is connected to the traveling machine body 10, and is configured to enable the riding of the worker. The riding part 40 mainly includes a first member 41 and a second member 43.

The first member 41 is a plate-shaped member. The first member 41 mainly includes a central part 41a, a left part 41b, and a right part 41c.

The central part 41a is a part formed in a rectangle in plan view. The left part 41b and the right part 41c are parts formed by bending the left end and the right end of the first member 41 such that the left end and the right end rise. The bottom surface of the central part 41a is connected to the rear end of the machine body frame 11.

The second member 43 is a plate-shaped member. The second member 43 is formed in a rectangle that is one size smaller than the central part 41a of the first member 41, in plan view. In the central part in the left and right direction of the second member 43, a partition part 43a is formed. The partition part 43a is a part formed such that the central part in the left and right direction of the second member 43 rises from the front to the back. In the front end of the partition part 43a, an opening 43b that communicates the inside and the outside of the partition part 43a is formed. The partition part 43a partitions the upper surface of the second member 43 into the left and the right.

The surface on the left of the thus partitioned upper surface of the second member 43 serves as a left leg placing surface 44L for placing a left leg of the worker. Similarly, the surface on the right of the upper surface of the second member 43 serves as a right leg placing surface 44R for placing a right leg of the worker. The partition part 43a is formed in the second member 43, so that a part where the left leg of the worker is placed, and a part where the right leg is placed can be apparently distinguished. The second member 43 is disposed on the upper part of the central part 41a of the first member 41.

Between the first member 41 and the second member 43, a plurality of load sensors (a left front load sensor 50a, a left back load sensor 50b, a right front load sensor 50c, and a right back load sensor 50d) are disposed. Specifically, the second member 43 is placed on the plurality of load sensors disposed on the upper surface of the first member 41. The plurality of load sensors can detect a load applied to the second member 43 (specifically, a load by the worker who riding on the second member 43).

The left front load sensor 50a is disposed near the front end of the left leg placing surface 44L of the second member 43 in plan view.

The left back load sensor 50b is disposed behind the left front load sensor 50a and near the rear end of the left leg placing surface 44L of the second member 43 in plan view.

The right front load sensor 50c is disposed near the front end of the right leg placing surface 44R of the second member 43 (at a position symmetrical to the left front load sensor 50a with the partition part 43a interposed between the right front load sensor 50c and the left front load sensor 50a) in plan view.

The right back load sensor 50d is disposed near the rear end of the right leg placing surface 44R of the second member 43 (at a position symmetrical to the left back load sensor 50b with the partition part 43a interposed between the right back load sensor 50d and the left back load sensor 50b) in plan view.

Thus, the left front load sensor 50a and the right front load sensor 50c, and the left back load sensor 50b and the right back load sensor 50d are disposed by being shifted in the front and back direction. Additionally, the left front load sensor 50a and the left back load sensor 50b, and the right front load sensor 50c and the right back load sensor 50d are disposed by being shifted in the left and right direction.

Wires 51 connected to the left front load sensor 50a, the left back load sensor 50b, the right front load sensor 50c, and the right back load sensor 50d are collected to the center in the left and right direction, and are guided forward through a space inside the partition part 43a of the second member 43. The wires 51 are guided to the outside of the partition part 43a through the opening 43b, to be connected to the controller 24a described later.

The driven wheel 60L and the driven wheel 60R support the riding part. The driven wheel 60L and the driven wheel 60R are provided below the left part 41b and the right part 41c of the first member 41, respectively. The driven wheel 60L and the driven wheel 60R are non-driving wheels, and can rotate while freely changing the direction in accordance with the movement of the lawn mower 1.

The handle 70 shown in FIG. 2 to FIG. 7 is connected to the traveling machine body 10 so as to be swingable left and right with respect to the traveling machine body 10. The handle 70 mainly includes a fulcrum shaft 71, a handle main body 72, a grip part 73, a work switch 74, and a control changeover switch 75.

Figure 6:
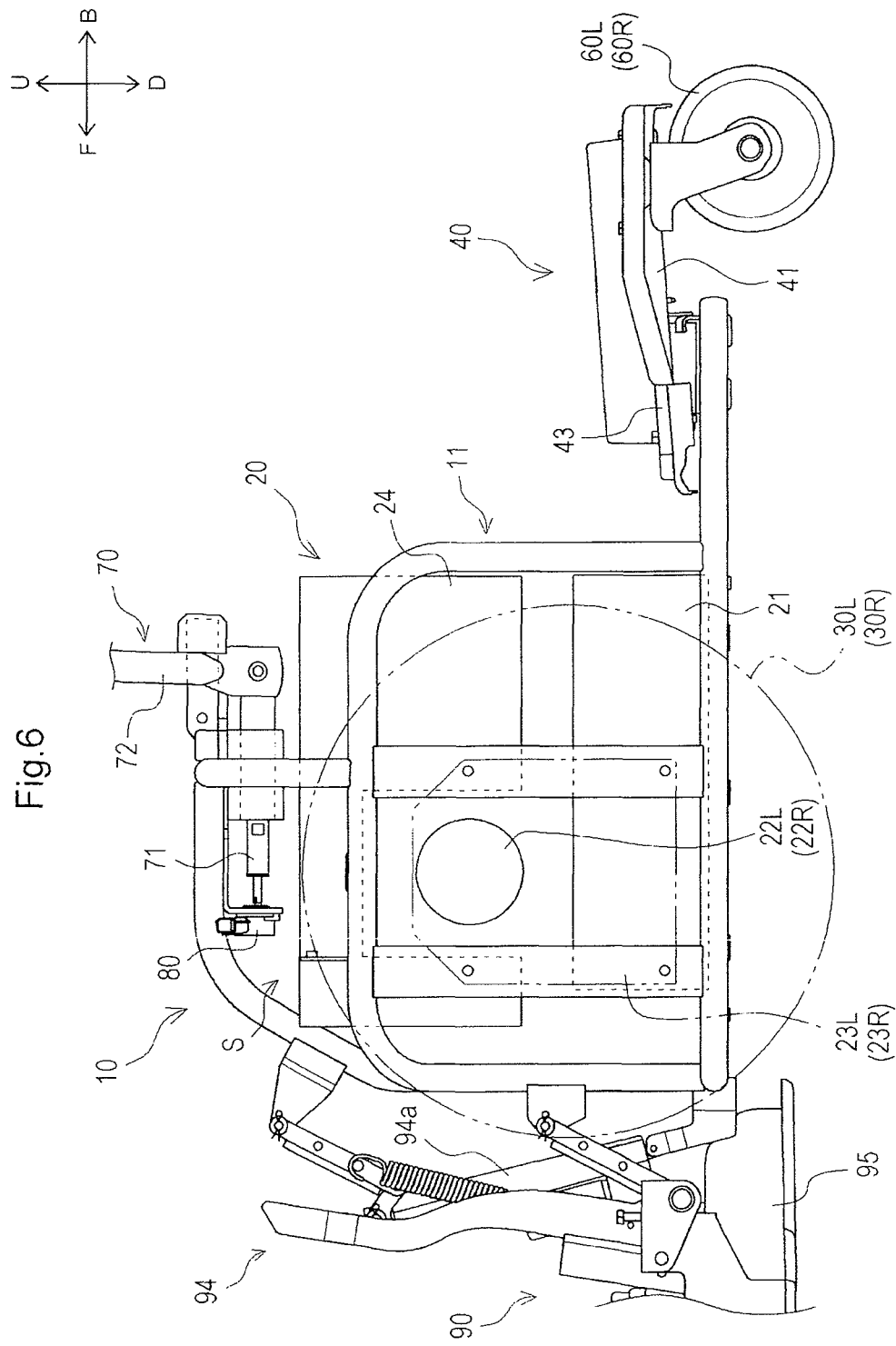
FIG. 6 is a side view showing a traveling machine body and a riding part.
Figure 7:
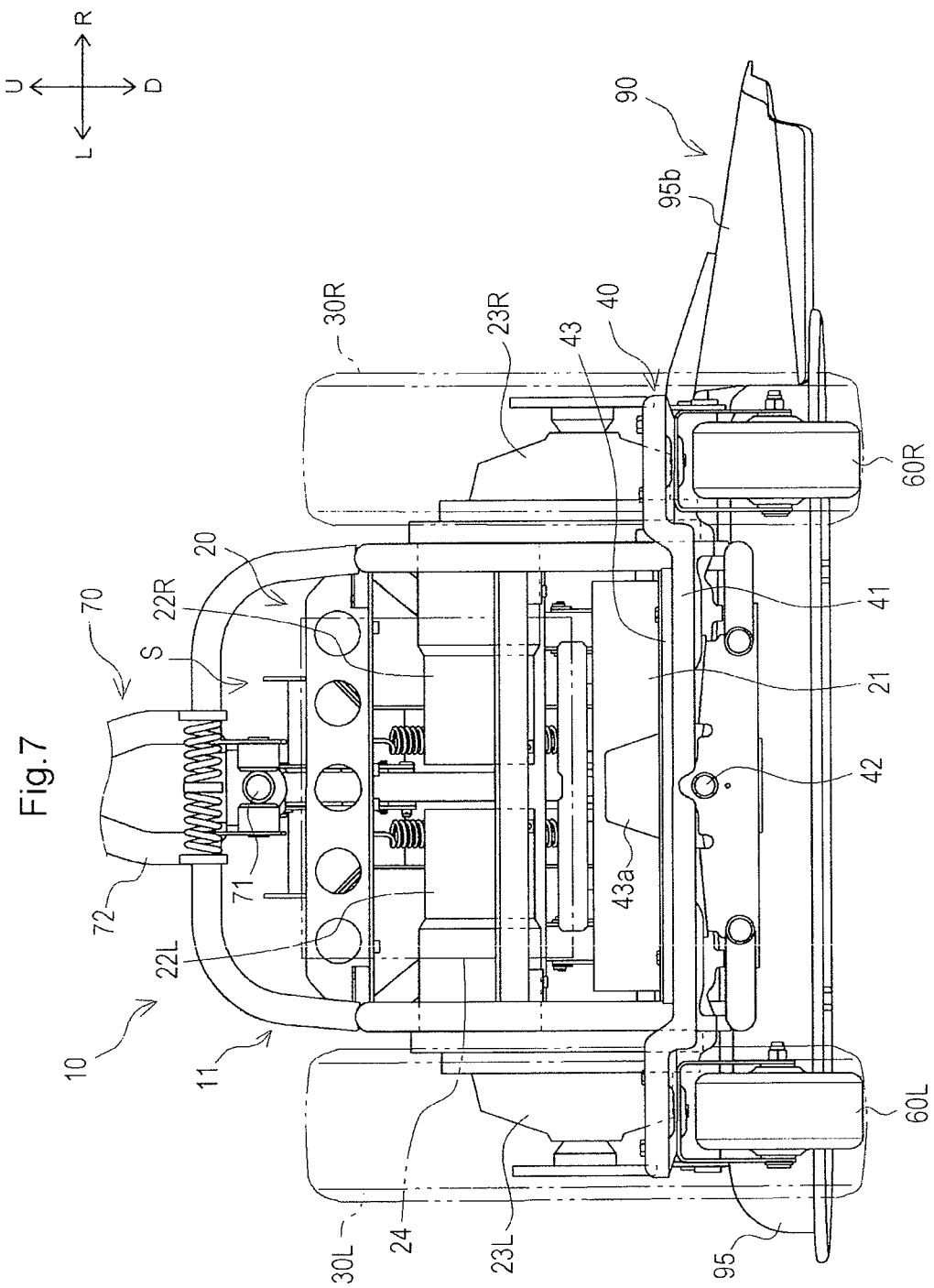
FIG. 7 is a rear view showing the traveling machine body and the riding part.
Figure 8:
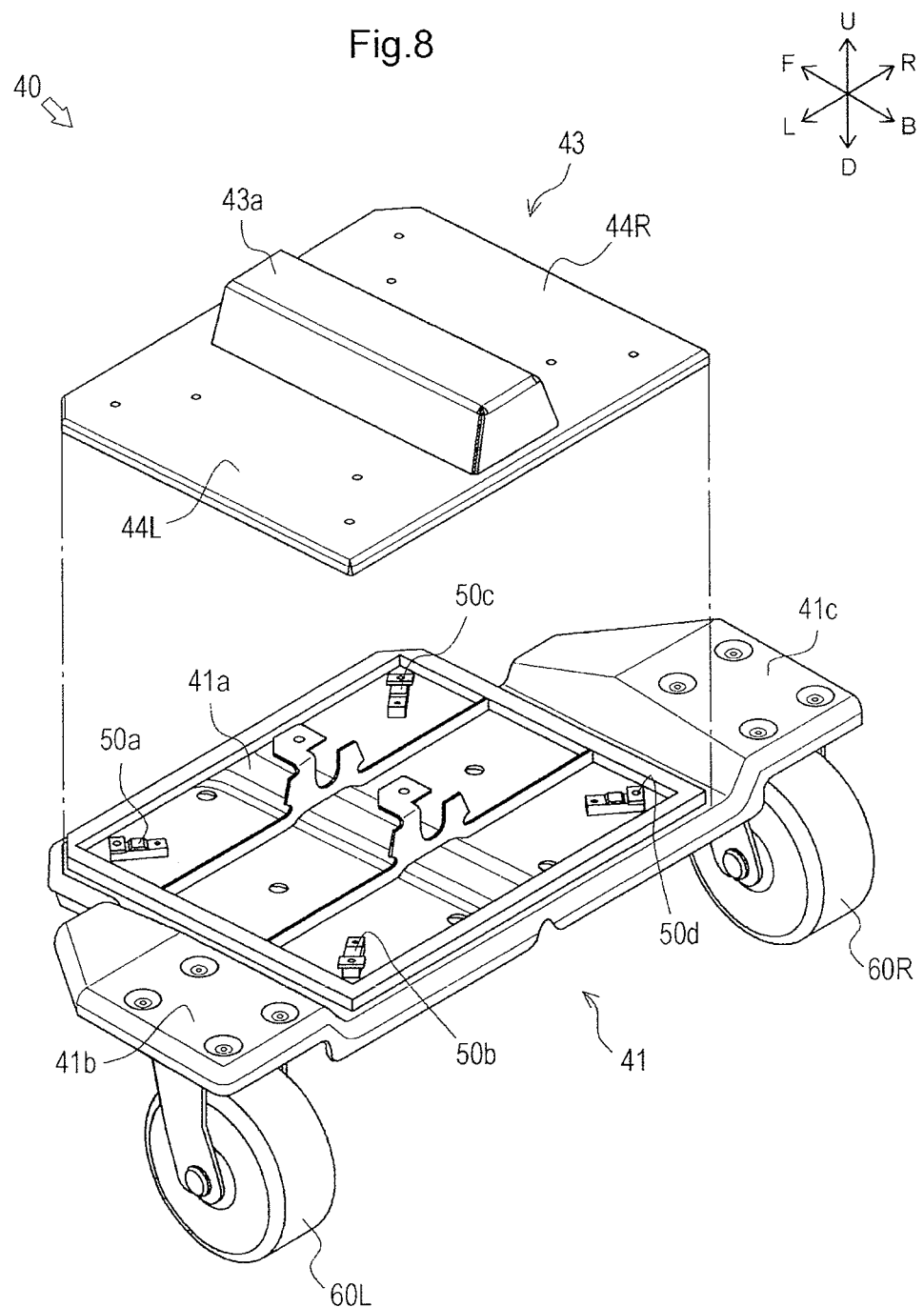
FIG. 8 is an exploded perspective view showing the riding part.
Figure 9:
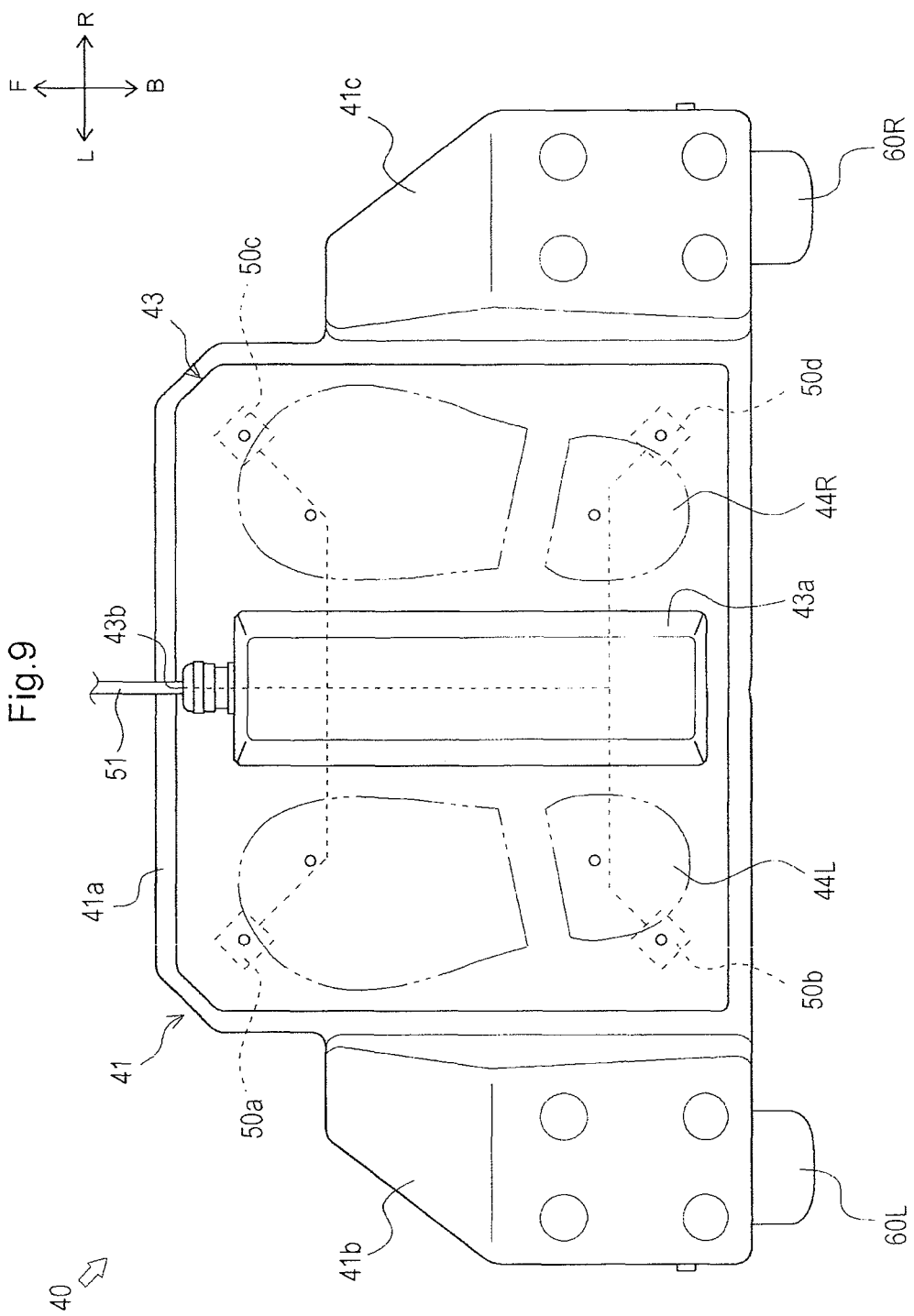
FIG. 9 is a plan view of the riding part.

The fulcrum shaft 71 shown in FIG. 6 and FIG. 7 serves as a swing fulcrum of the handle 70. The fulcrum shaft 71 is rotatably supported by the upper end of the machine body frame 11 with the longitudinal direction of the fulcrum shaft 71 being directed in the front and back direction.

Figure 3:
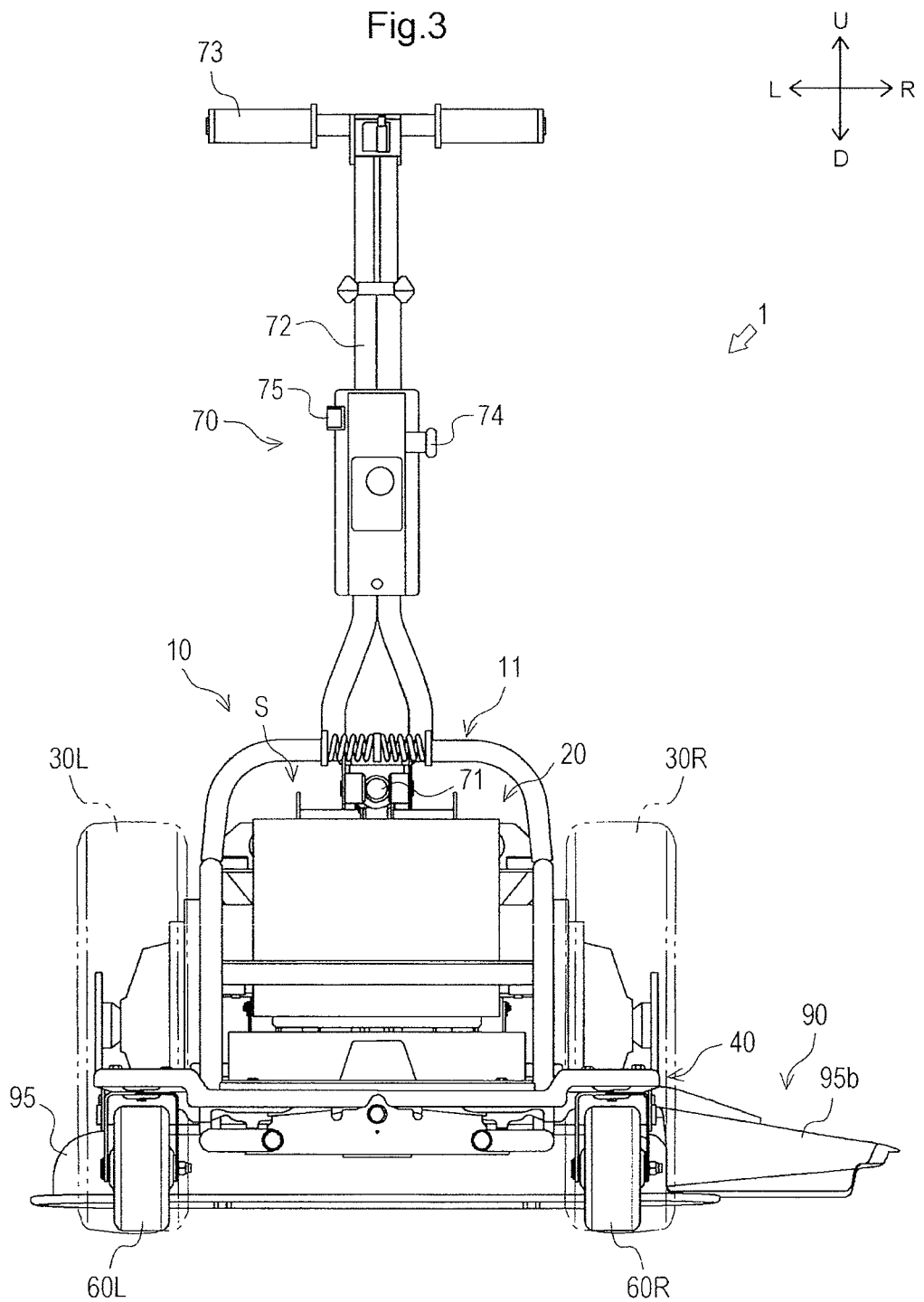
FIG. 3 is a rear view of the lawn mower.
Figure 4:
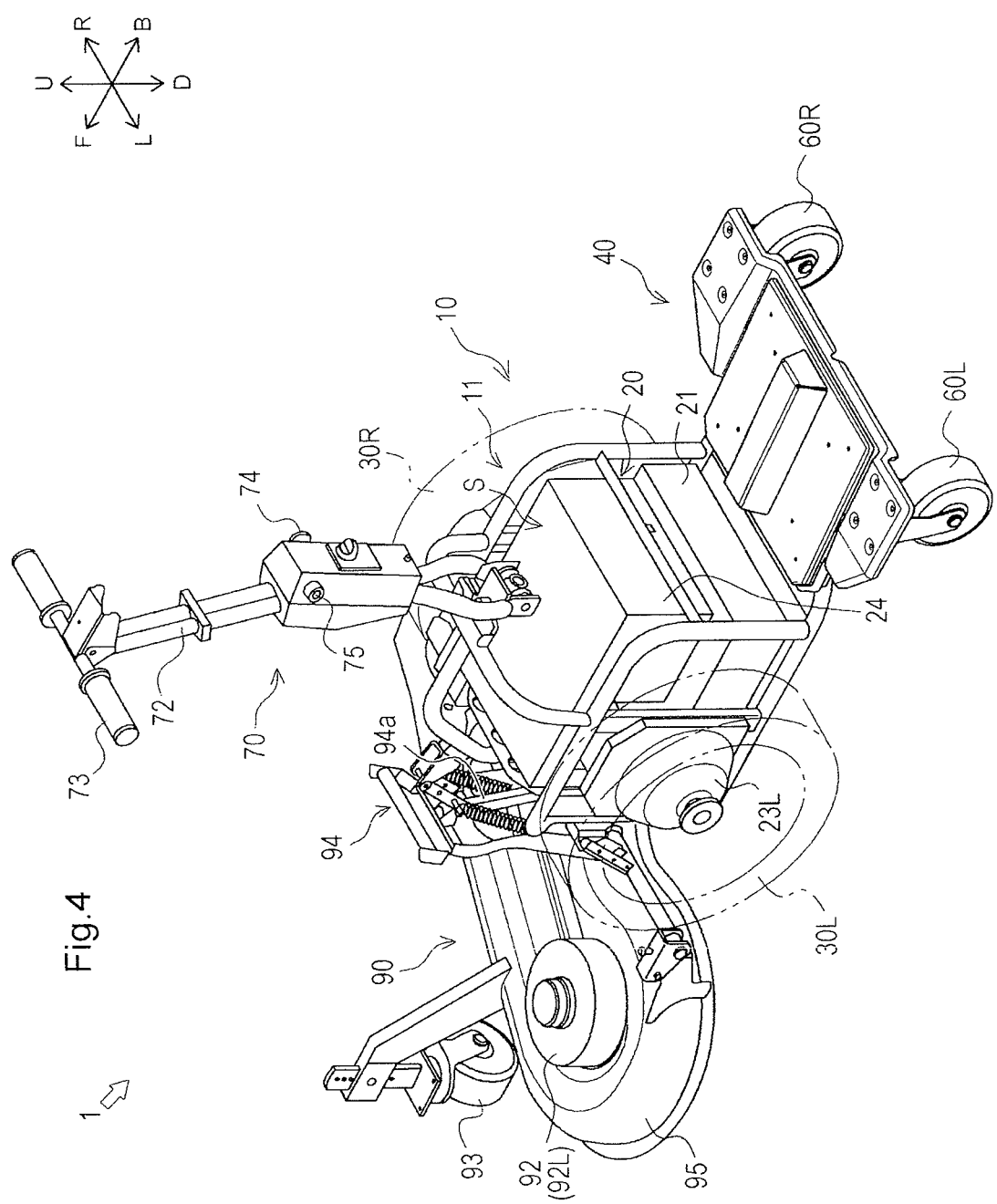
FIG. 4 is a back perspective view of the lawn mower.

The handle main body 72 shown in FIG. 2 to FIG. 4 serves as a main structure of the handle 70. The handle main body 72 is provided so as to extend upward from the rear upper part of the traveling machine body 10. The lower end of the handle main body 72 is fixed to the rear end of the fulcrum shaft 71. Consequently, the handle main body 72 is connected to the traveling machine body 10 so as to be swingable left and right with respect to the traveling machine body 10.

The grip part 73 shown in FIG. 2 to FIG. 4 is a part where the worker who is riding on the riding part 40 can grip by a hand. The grip part 73 is formed so as to extend from the upper end of the handle main body 72 to the left and right. The height of the grip part 73 (i.e., the height of the upper end of the handle main body 72) is preset to a height allowing easy gripping of the worker who is riding on the riding part 40 (e.g., a height equal to the level of a chest of the worker (see FIG. 1)).

The work switch 74 is an operation tool for switching on and off of the driving of the mower unit 90 described later. The work switch 74 is provided in the middle in the vertical direction of the handle main body 72.

The control changeover switch 75 is an embodiment of a selection unit according to the disclosure, and is an operation tool for switching control performed by the controller 24a described later. The control changeover switch 75 is provided in the middle in the vertical direction of the handle main body 72.

In the handle 70 thus configured, the worker can grip the grip part 73 and swingably operate the handle main body 72 (handle 70) left and right with the fulcrum shaft 71 as a swing fulcrum.

As shown in FIG. 6, to the front end of the fulcrum shaft 71, a rotation angle sensor 80 is connected. The rotation angle sensor 80 is configured by a potentiometer. The rotation angle sensor 80 is fixed to the upper end of the machine body frame 11, and is connected to the front end of the fulcrum shaft 71. Consequently, the rotation angle sensor 80 can detect the rotation angle of the fulcrum shaft 71, and also detect the swinging operation amount of the handle 70.

Figure 5:
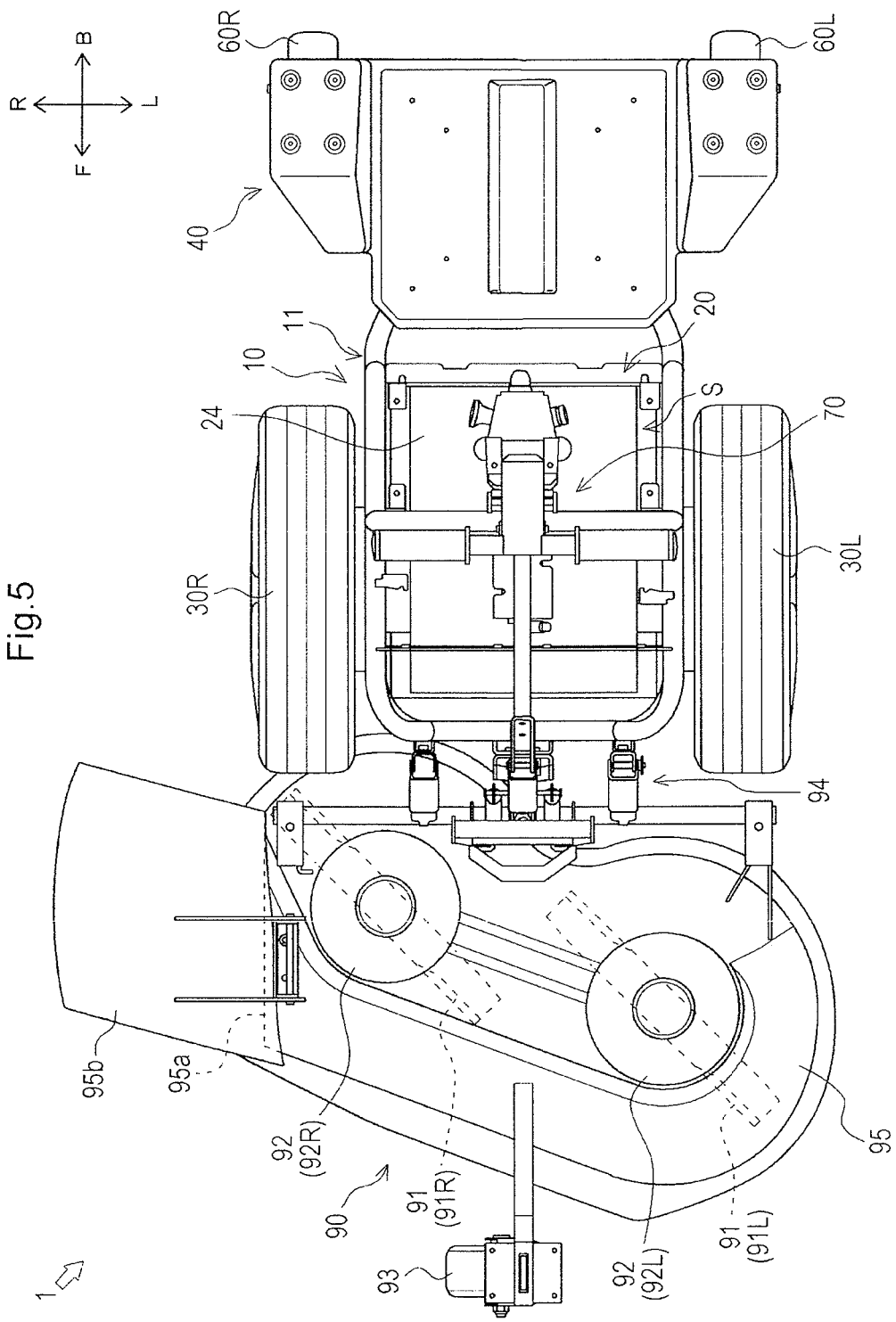
FIG. 5 is a plan view of the lawn mower.

The mower unit 90 shown in FIG. 4 to FIG. 6 is an embodiment of a work device according to the disclosure, and is a work device for performing lawn mowing work. The mower unit 90 mainly includes a mower deck 95, blades 91, blade motors 92, a gauge wheel 93, and a lifting and lowering link 94.

The mower deck 95 serves as a main structure of the mower unit 90. The mower deck 95 is formed in a substantially box shape with an opened bottom surface. In the right end of the mower deck 95, a discharge port 95a (see FIG. 5) for communicating the inside and the outside of the mower deck 95 is formed. The discharge port 95a is covered by a guide member 95b from the above.

The blades 91 are tools for mowing lawn (performing lawn mowing work), driven by rotational power. The two blades 91 are disposed side by side in the substantially left and right direction inside the mower deck 95. Hereinafter, the blade 91 disposed on the left side is described as a left blade 91L, and the blade 91 disposed on the right side is described as a right blade 91R.

The blade motors 92 are an embodiment of a power device and a working motor according to the disclosure, and generate rotational power for rotating the blades 91 by using electric power. The blade motors 92 are provided to correspond to the respective two blades 91. The blade motors 92 are provided on the upper part of the mower deck 95. The output shafts of the blade motors 92 are provided so as to extend downward (in the mower deck 95), and connected to the respective blades 91. The respective rotation numbers of the two blade motors 92 can be optionally changed. Hereinafter, the blade motor 92 provided to correspond to the left blade 91L is described as a left blade motor 92L, and the blade motor 92 provided to correspond to the right blade 91R is described as a right blade motor 92R.

The gauge wheel 93 supports the mower deck 95. The gauge wheel 93 is provided in the front end of the mower deck 95. The gauge wheel 93 is a non-driving wheel, and can rotate while freely changing the direction in accordance with the movement of the lawn mower 1.

The lifting and lowering link 94 is a link for liftably connecting the mower deck 95 to the traveling machine body 10. The lifting and lowering link 94 has a first end (front end) connected to the rear end of the mower deck 95. The lifting and lowering link 94 has a second end (rear end) connected to the front end of the machine body frame 11 of the traveling machine body 10. The lifting and lowering link 94 includes an electric cylinder 94a. The electric cylinder 94a is extended and contracted, so that the mower deck 95 can be lifted and lowered with respect to the traveling machine body 10.

Figure 10:
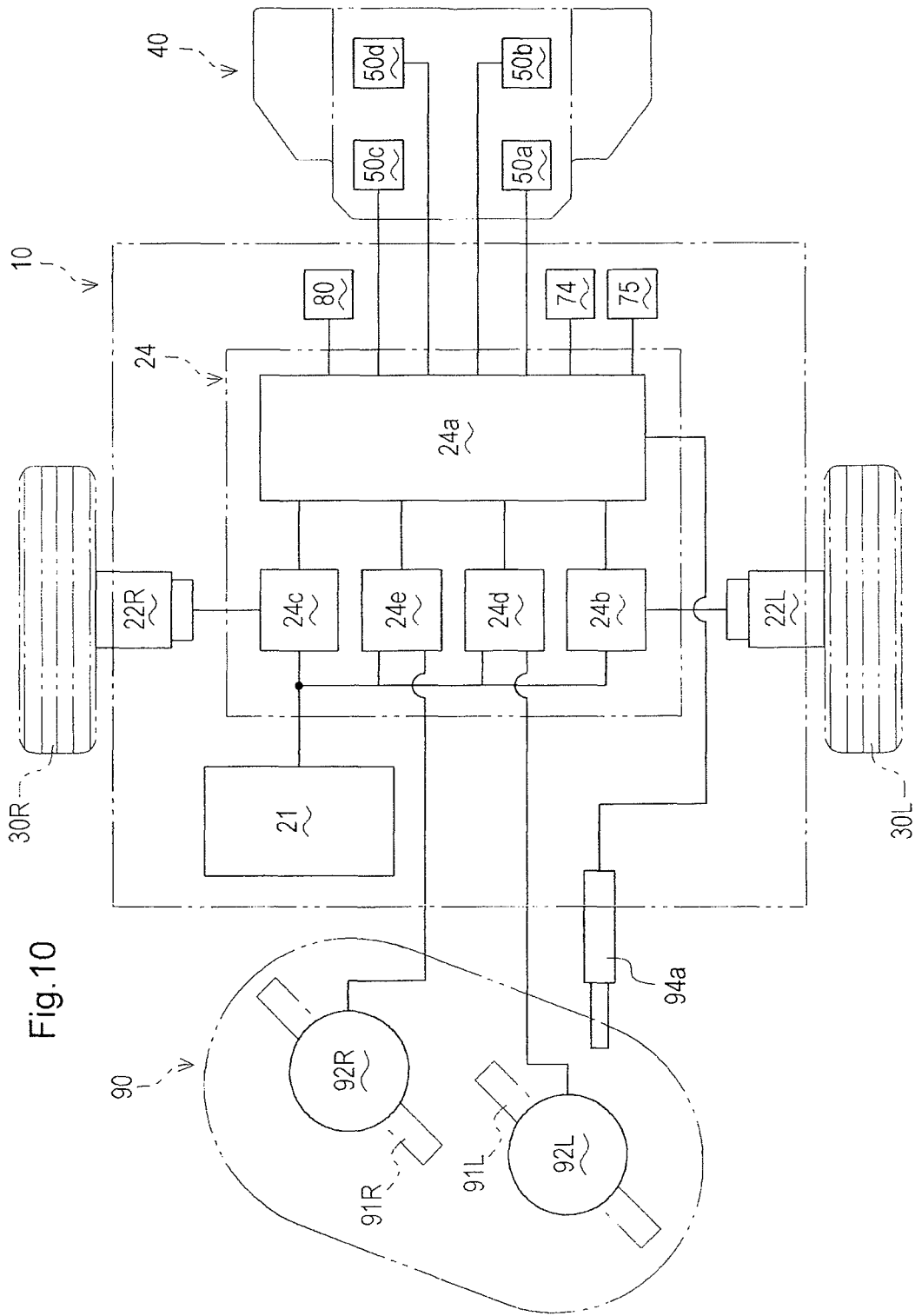
FIG. 10 is a schematic diagram showing a configuration related to the control of the lawn mower.

Hereinafter, a configuration for controlling the driving of the lawn mower 1 is described with reference to FIG. 10.

The controller 24a is an embodiment of a control device, a first calculation unit, and a second calculation unit according to the disclosure, and controls the operation of each connected device. The controller 24a is configured by a storage part, an arithmetic processing part, and the like. The controller 24a stores a program for controlling each device and various data.

The controller 24a is connected to the left front load sensor 50a, the left back load sensor 50b, the right front load sensor 50c, and the right back load sensor 50d, and can receive results of loads detected by these load sensors.

The controller 24a is connected to the rotation angle sensor 80, and can receive a result of the swinging operation amount of the handle 70 detected by the rotation angle sensor 80.

The controller 24a is connected to the work switch 74, and can receive a signal related to the operation of the work switch 74.

The controller 24a is connected to the control changeover switch 75, and can receive a signal related to the operation of the control changeover switch 75.

The controller 24a is connected to the left inverter 24b, and can control the driving of the left inverter 24b. The controller 24a optionally supplies electric power from the battery 21 to the left motor 22L through the left inverter 24b, so that the rotational speed of the driving wheel 30L can be optionally controlled.

The controller 24a is connected to the right inverter 24c, and can control the driving of the right inverter 24c. The controller 24a optionally supplies electric power from the battery 21 to the right motor 22R through the right inverter 24c, so that the rotational speed of the driving wheel 30R can be optionally controlled.

The controller 24a is connected to the left working inverter 24d, and can control the driving of the left working inverter 24d. The controller 24a optionally supplies electric power from the battery 21 to the left blade motor 92L through the left working inverter 24d, so that the rotational speed of the left blade 91L can be optionally controlled, and perform lawn mowing work. Additionally, the controller 24a can detect electric power (electric power consumption) consumed by the left blade motor 92L, through the left working inverter 24d.

The controller 24a is connected to the right working inverter 24e, and can control the driving of the right working inverter 24e. The controller 24a optionally supplies electric power from the battery 21 to the right blade motor 92R through the right working inverter 24e, so that the rotational speed of the right blade 91R can be optionally controlled, and perform lawn mowing work. Additionally, the controller 24a can detect electric power consumption of the right blade motor 92R through the right working inverter 24e.

The controller 24a is connected to the electric cylinder 94a of the lifting and lowering link 94, and can change the length of the electric cylinder 94a. When a mower height adjusting switch (not shown) provided in the handle 70 is operated, the controller 24a can change the length of the electric cylinder 94a in accordance with the operation amount of the mower height adjusting switch, and also change the height of the mower deck 95.

Hereinafter, description is given of control performed by controller 24a when a worker drives the lawn mower 1 configured as described above.

First, control performed by the controller 24a when the lawn mower 1 is allowed to travel (is moved forward or backward) is described.

In a case where the lawn mower 1 is driven, the worker rides on the riding part 40, and grips the grip part 73 of the handle 70 by a hand (see FIG. 1). At this time, a left leg and a right leg of the worker are placed on the left leg placing surface 44L and the right leg placing surface 44R, respectively (see FIG. 9).

When the worker shifts his/her weight forward and backward (specifically, applies his/her weight to toes or heels), the controller 24a moves the lawn mower 1 forward or backward based on the forward and backward weight shift of the worker. Hereinafter, specific description is made.

The controller 24a calculates a forward and backward weight shift of the worker based on loads always detected by the plurality of load sensors (the left front load sensor 50a, the left back load sensor 50b, the right front load sensor 50c, and the right back load sensor 50d). Specifically, the controller 24a calculates a weight shift of the worker from change of balance between a total value of loads detected by the left front load sensor 50a and the right front load sensor 50c, and a total value of loads detected by the left back load sensor 50b, and the right back load sensor 50d.

The detection values of the plurality of load sensors that are used as a reference of the calculation of the weight shift (detection values detected when the traveling vehicle neither move forward nor backward) can be set by an arbitrary method. For example, the controller 24a can be configured to previously store the detection values, or store detection values of the plurality of load sensors detected when the worker rides on the riding part 40.

In a case where the controller 24a determines that the weight shift of the worker occurs, the controller 24a supplies electric power to the left motor 22L and the right motor 22R to drive the driving wheel 30L and the driving wheel 30R. Specifically, in a case where a forward weight shift occurs, the controller 24a rotates the driving wheel 30L and the driving wheel 30R forward to move the lawn mower 1 forward. In a case where a backward weight shift occurs, the controller 24a rotates the driving wheel 30L and the driving wheel 30R backward to move the lawn mower 1 backward. Additionally, the controller 24a increases the rotational speeds of the driving wheel 30L and the driving wheel 30R as the weight shift amount of the worker is larger, and moves the lawn mower 1 forward or backward at a higher speed.

When the worker swings the handle 70 left and right, the controller 24a turns the lawn mower 1 left or right based on the swinging operation amount of the handle 70. Hereinafter, specific description is made.

The controller 24a supplies electric power to the left motor 22L and the right motor 22R based on the swinging operation amount of the handle 70 always detected by the rotation angle sensor 80, to drive the driving wheel 30L and the driving wheel 30R. Specifically, when the handle 70 is swingably operated left, the controller 24a rotates the driving wheel 30L backward, and rotates the driving wheel 30R forward, to turn the lawn mower 1 in the left direction on the spot. Additionally, when the handle 70 is swingably operated right, the controller 24a rotates the driving wheel 30L forward, and rotates the driving wheel 30R backward, to turn the lawn mower 1 in the right direction on the spot.

Furthermore, when the weight shift of the worker and the swinging operation of the handle 70 are performed at the same time, the controller 24a can turn the lawn mower 1 left or right while moving the lawn mower 1 forward or backward (i.e., turn to the left or the right). Thus, the worker performs the weight shift and the swinging operation of the handle 70, so that the worker can intuitively drive the lawn mower 1.

Control performed by the controller 24a when lawn mowing work is performed by using the mower unit 90 of the lawn mower 1 is now described.

When the worker operates the work switch 74 (ON operation), the controller 24a supplies electric power to the blade motors 92 to rotate the blades 91. The lawn mower 1 is allowed to travel in this state, so that lawn mowing work can be performed. Furthermore, when the worker operates the work switch 74 (OFF operation), the controller 24a stops supplying electric power to the blade motors 92, to stop rotating the blades 91.

As a method of controlling the rotation numbers of the blades 91, the controller 24a can select any one of non-energy-saving control and energy-saving control to perform the control.

The non-energy-saving control is control for keeping the rotation numbers of the two blades 91 constant. Specifically, in a case where the non-energy-saving control is selected, the controller 24a always rotates the two blades 91 (the left blade 91L and the right blade 91R) at the maximum rotation number. In the non-energy-saving control, the rotation numbers of the blades 91 are never changed (particularly, decreased). Therefore, in a case where work of blowing and discharging mown lawns, dead leaves or the like from the discharge port 95a by utilizing wind generated by the rotation of the blades 91 is performed, the non-energy-saving control is more suitable than the energy-saving control described later.

The rotation numbers of the blades 91 in the non-energy-saving control are not limited to the maximum rotation number, and can be preset to an arbitrary value.

The energy-saving control is control of increasing and decreasing the respective rotation numbers of the two blades 91 in accordance with increase and reduction of the speeds of the two blades 91 to the ground. Specifically, the controller 24a previously stores a rotation number map (see FIG. 13. Details are described later) showing a relation between the speeds of the blades 91 to the ground, and the rotation numbers of the blades 91 (blade motors 92) suitable for the speeds. The rotation number map is set so as to decrease the rotation numbers of the blades 91 as the speeds of the blades 91 to the ground reduce. In a case where the energy-saving control is selected, the controller 24a increases and decreases the respective rotation numbers of the two blades 91 in accordance with increase and reduction of the speeds of the two blades 91 to the ground, based on the rotation number map.

The controller 24a performs such energy-saving control, so that the rotation numbers of the blades 91 can be decreased to reduce electric power consumed in order to rotate the blades 91, in a case where the speeds of the blades 91 to the ground reduce.

The detailed contents of the energy-saving control are described later.

Each time the worker operates the control changeover switch 75, the controller 24a switches between the above non-energy-saving control and energy-saving control. That is, by simply operating the control changeover switch 75, the worker can optionally select the non-energy-saving control or the energy-saving control to perform the control.

Hereinafter, the details of the energy-saving control performed by the controller 24a is described. In a case where the worker operates the energy-saving control, the controller 24a sequentially performs processes shown in FIG. 12.

Figure 11:
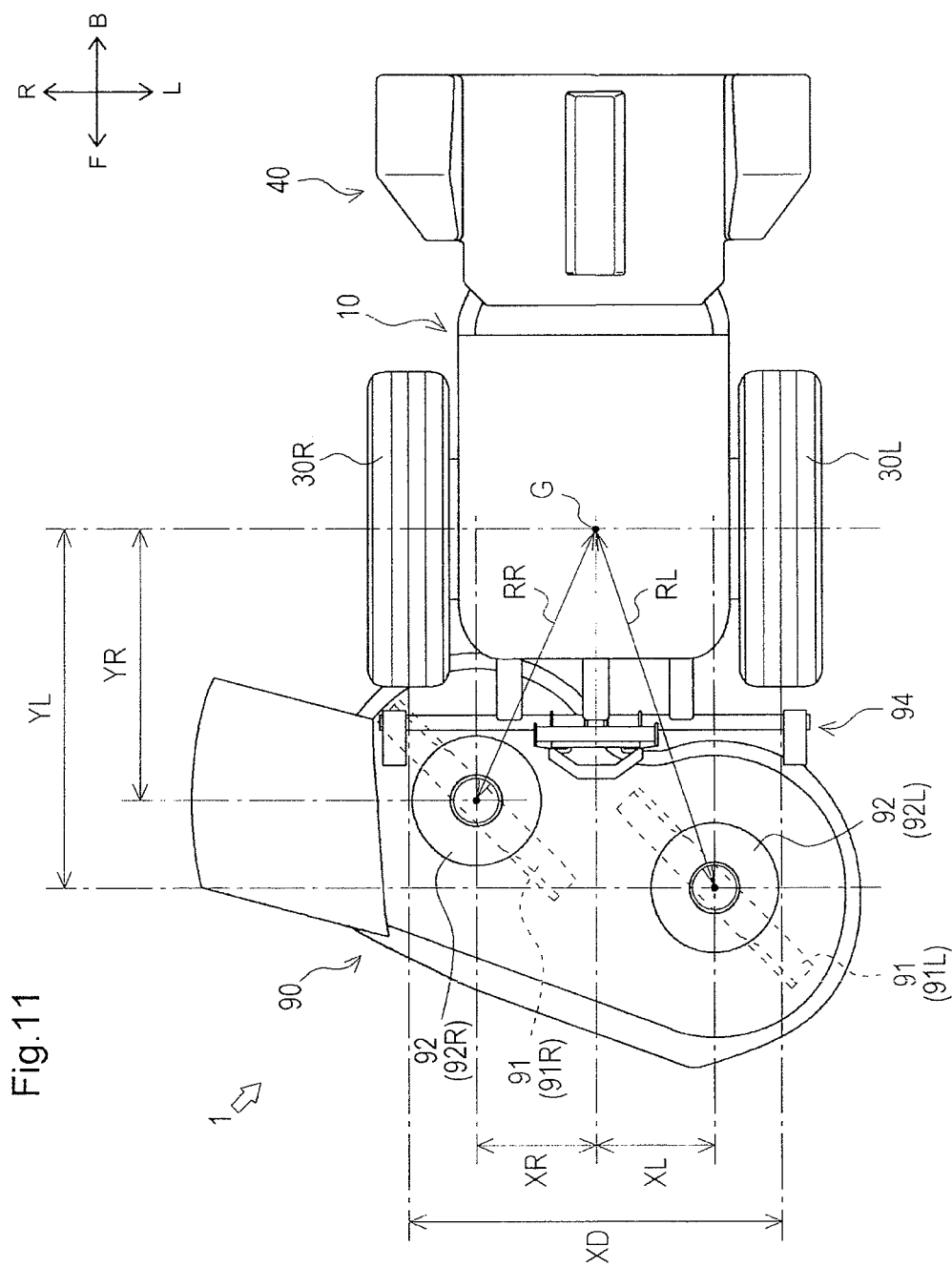
FIG. 11 is a schematic plan view showing various elements of the lawn mower.

Herein, when processes in step S101 and step S102 in FIG. 12, described later are performed, various elements (dimensions) of the lawn mower 1 are used. Specifically, as shown in FIG. 11, a distance (tread) XD between the centers of the left and right driving wheels (the driving wheel 30L and the driving wheel 30R), a distance XL in the left and right direction from the intermediate point G of the left and right driving wheels to the center of the left blade 91L, a distance XR in the left and right direction from the intermediate point G to the center of right blade 91R, a distance YL in the front and back direction from the intermediate point G to the center of the left blade 91L, and a distance YR in the front and back direction from the intermediate point G to the center of the right blade 91R are used.

The above distance XD, distance XL and distance XR each are a fixed value (value determined by a configuration of the lawn mower 1), and previously stored in the controller 24a.

The above distance YL and distance YR change in accordance with the height of the mower deck 95 (i.e., length of the electric cylinder 94a) lifted and lowered by the lifting and lowering link 94. The controller 24a previously stores a map showing relations between the length of the electric cylinder 94a and the distances YL and YR. The controller 24a can calculate the distance YL and the distance YR based on the length of the electric cylinder 94a and the map.

Figure 12:
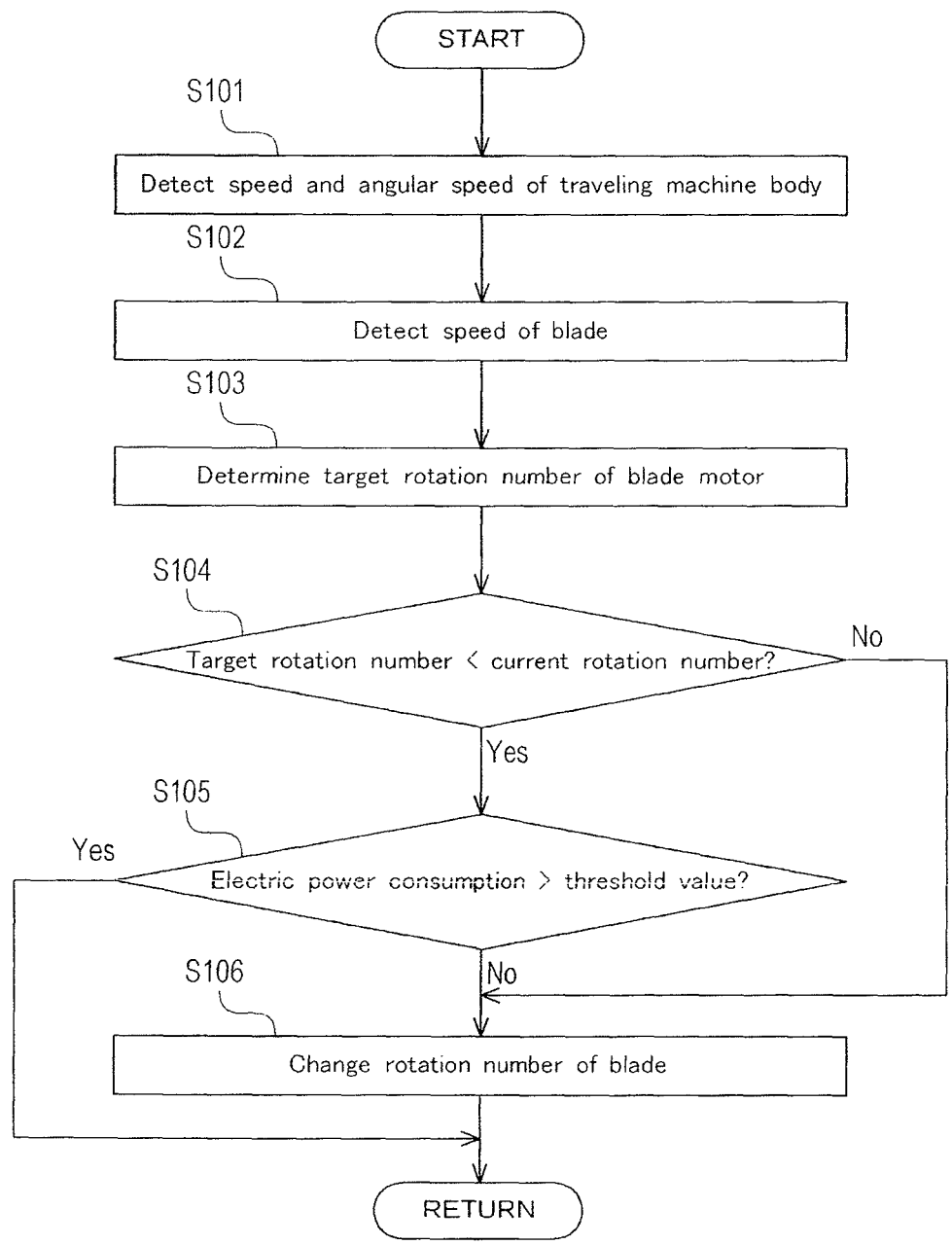
FIG. 12 is a flowchart showing the contents of energy-saving control.

In a flowchart shown in FIG. 12, the left blade 91L (left blade motor 92L) and the right blade 91R (right blade motor 92R) are controlled in a similar manner. Accordingly, the following description is made while mainly focusing on the left blade 91L (left blade motor 92L), and description for the right blade 91R (right blade motor 92R) is added as necessary.

In step S101 of FIG. 12, the controller 24a detects the speed V and the angular speed ω of the traveling machine body 10 to the ground (more specifically, at the intermediate point G). Specifically, the controller 24a first calculates (detects) the speed VL of the driving wheel 30L to the ground and the speed VR of the driving wheel 30R to the ground by using the following Expression 1 and Expression 2.

$$VL = V0L \times N \times \pi \times D \qquad \text{[Expression 1]}$$

$$VR = V0R \times N \times \pi \times D \qquad \text{[Expression 2]}$$

Herein, V0L, V0R, N, and D in the above Expression 1 and Expression 2 denote the rotation number of the left motor 22L per unit time, the rotation number of the right motor 22R per unit time, the reduction ratio of each of the left power transmission mechanism 23L and the right power transmission mechanism 23R, and the diameter of each of the driving wheel 30L and the driving wheel 30R, respectively.

Thus, the left motor 22L, the right motor 22R, and the controller 24a configure a unit for detecting the speed VL of the driving wheel 30L and the speed VR of the driving wheel 30R (driving wheel speed detection unit according to the disclosure).

Now, the controller 24a calculates (detects) the speed V of the traveling machine body 10 by using the following Expression 3.

$$V = (VL + VR)/2 \qquad \text{[Expression 3]}$$

The controller 24a calculates the angular speed ω of the traveling machine body 10 by using the following Expression 4.

$$\omega = (VL - VR)/XD \qquad \text{[Expression 4]}$$

Thus, the above driving wheel speed detection unit and the controller 24a configure a unit for detecting the speed V and the angular speed ω of the traveling machine body 10 (machine body speed detection unit according to the disclosure).

The controller 24a advances to step S102 after performing the process in step S101.

In step S102, the controller 24a detects the speed VBL of the left blade 91L to the ground (more specifically, of the center of the left blade 91L). Specifically, the controller 24a first calculates a distance RL from the intermediate point G to the center of the left blade 91L in plan view (see FIG. 11) by using the following Expression 5.

$$RL = \sqrt{XL^2 + YL^2} \qquad \text{[Expression 5]}$$

Then, the controller 24a calculates (detects) the speed VBL of the left blade 91L to the ground by using the following Expression 6.

$$VBL = V + RL \times |\omega| \qquad \text{[Expression 6]}$$
$$= (VL + VR)/2 + \sqrt{XL^2 + YL^2} \times$$
$$|VL - VR|/XD$$

In a case where the speed VBR of the right blade 91R (more specifically, of the center of the right blade 91R) is detected, the controller 24a first calculates a distance RR from the intermediate point G to the center of the right blade 91R in plan view (see FIG. 11) by using the following Expression 7.

$$RR = \sqrt{XR^2 + YR^2} \qquad \text{[Expression 7]}$$

Then, the controller 24a calculates (detects) the speed VBR of the right blade 91R to the ground by using the following Expression 8.

$$VBR = V + RR \times |\omega| \qquad \text{[Expression 8]}$$
$$= (VL + VR)/2 + \sqrt{XR^2 + YR^2} \times$$
$$|VL - VR|/XD$$

Thus, the above machine body speed detection unit and the controller 24a configure a unit for detecting the speed VBL of the left blade 91L and the speed VBR of the right blade 91R (blade speed detection unit according to the disclosure).

The controller 24a advances to step S103 after performing the process in step S102.

In step S103, the controller 24a determines a target value of the rotation number of the left blade 91L, namely a target value VML of the rotation number (the target rotation number) of the left blade motor 92L. Specifically, the controller 24a determines the target rotation number VML of the left blade motor 92L based on the previously stored rotation number map (see FIG. 13), and the speed VBL of the left blade 91L to the ground, which is detected in step S102.

Figure 13:
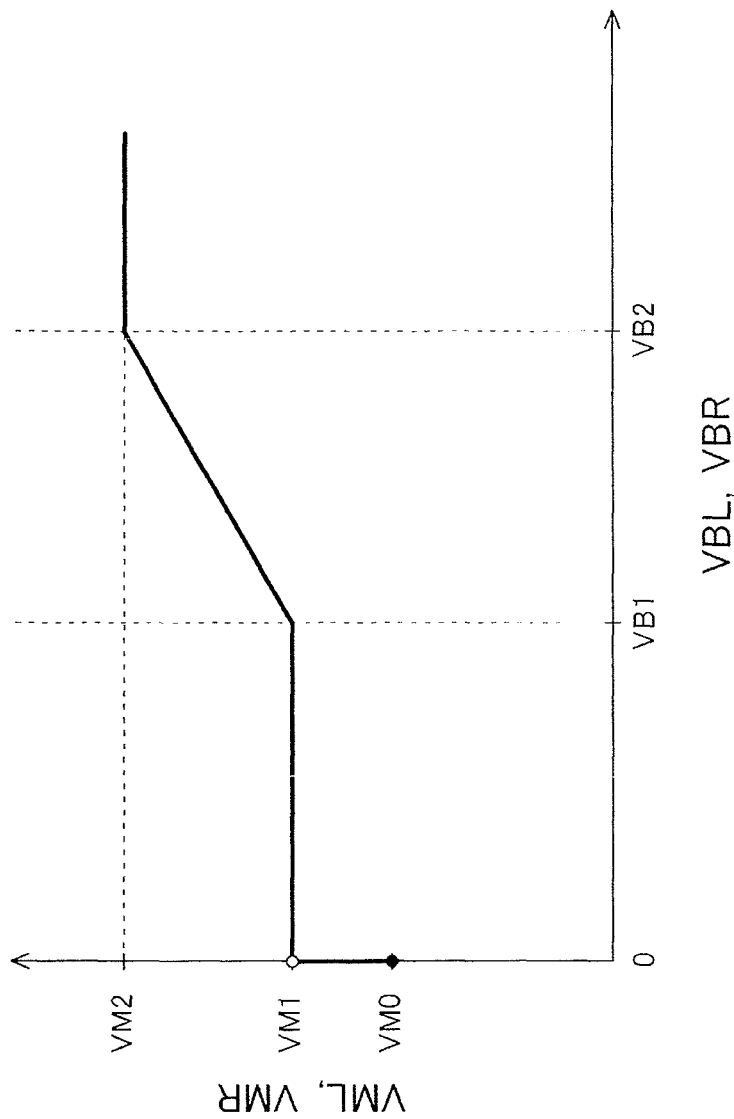
FIG. 13 is a diagram showing a rotation number map.

Herein, the above rotation number map is described with reference to FIG. 13.

The rotation number map shows relations between the speeds of the blades 91 (the speed VBL of the left blade 91L and the speed VBR of the right blade 91R), and the target rotation numbers of the blade motors 92 (the target rotation number VML of the left blade motor 92L and the target rotation number VMR of the right blade motor 92R) suitable for lawn mowing work performed by the blades 91 moving at the speeds. The rotation number map is preset based on experimentation, a numerical analysis, or the like.

In the rotation number map, a relation between the speed VBL and the target rotation number VML, and a relation between the speed VBR and the target rotation number VMR are set to be the same. Accordingly, the rotation number map is hereinafter described by focusing on the relation between the speed VBL and the target rotation number VML.

In the rotation number map, in a case where the speed VBL of the left blade 91L is 0, the target rotation number VML of the left blade motor 92L is set to VM0.

Additionally, in the rotation number map, in a case where the speed VBL of the left blade 91L is within a range from greater than 0 to not greater than VB1 (0<VBL≤VB1), the target rotation number VML of the left blade motor 92L is set to VM1 (a value greater than VM0). The value VM1 of this target rotation number VML is set to the minimum rotation number required for performing lawn mowing work by the blades 91.

Herein, as the speed VBL of the left blade 91L increases, an area where the left blade 91L performs lawn mowing work per unit time increases. Therefore, in order to suitably perform lawn mowing work, it is necessary to increase the rotation number of the left blade 91L with the increase in the speed VBL.

On the other hand, as the speed VBL reduces, an area where the left blade 91L performs lawn mowing work per unit time decreases. In this case, even when the rotation number of the left blade 91L is decreased compared to the rotation number when the speed VBL is greater, the accuracy of the lawn mowing work is not lowered. Therefore, the rotation number of the left blade 91L decreases with reduction in the speed VBL, so that it is possible to improve energy saving performance (reduce electric power consumed by the left blade motor 92L).

Therefore, in the above rotation number map, in a case where the speed VBL of the left blade 91L is within a range from greater than VB1 to not greater than VB2 (VB1<VBL≤VB2), the target rotation number VML of the left blade motor 92L is set so as to increase and decrease with increase and reduction in the speed VBL of the left blade 91L. Consequently, it is possible to improve energy saving performance while suitably performing lawn mowing work.

In the rotation number map, in a case where the speed VBL of the left blade 91L is greater than VB2 (VB2<VBL), the target rotation number VML of the left blade motor 92L is set to VM2 (a value greater than VM1). The value VM2 of this target rotation number VML is set to the rotation number that is sufficiently high to enable accurate mowing work even when the speed VBL of the left blade 91L is any value.

Thus, in a range in which VBL is small (0<VBL≤VB1), the target rotation number VML is constantly held to the minimum value VM1, so that the minimum rotation number of the left blade 91L necessary for performing lawn mowing work is secured. In a range in which VBL is large (VB2<VBL), the target rotation number VML is constantly held to the maximum value VM2, so that the rotation number of the left blade 91L is prevented from increasing more than necessary.

The controller 24a determines the target rotation number VML of the left blade motor 92L based on the rotation number map set as described above, and the detected speed VBL of the left blade 91L.

In a case where the controller 24a determines the target value of the rotation number of the right blade 91R, namely the target rotation number VMR of the right blade motor 92R, the controller 24a determines the target rotation number VMR based on the previously stored rotation number map (see FIG. 13), and the speed VBR of the right blade 91R to the ground, which is detected in step S102.

The controller 24a advances to step S104 after performing the process in step S103.

In step S104, the controller 24a determines whether or not the target rotation number VML of the left blade motor 92L, which is determined in step S103 is smaller than the current actual rotation number VMLa of the left blade motor 92L.

In a case where the controller 24a determines that the target rotation number VML of the left blade motor 92L is smaller than the current actual rotation number VMLa of the left blade motor 92L, the controller 24a advances to step S105.

In a case where the controller 24a determines that the target rotation number VML of the left blade motor 92L is not less than the current actual rotation number VMLa of the left blade motor 92L, the controller 24a advances to step S106.

In step S104, the controller 24a also determines whether or not the target rotation number VMR of the right blade motor 92R is smaller than the current actual rotation number VMRa of the right blade motor 92R.

In step S105, the controller 24a determines whether or not the electric power consumption PL of the left blade motor 92L is greater than a predetermined threshold value PLS. Specifically, the controller 24a determines based on a previously stored electric power consumption threshold map (see FIG. 14), the current actual rotation number VMLa of the left blade motor 92L, and the detected electric power consumption PL of the left blade motor 92L whether or not the electric power consumption PL of the left blade motor 92L is greater than the predetermined threshold value PLS.

The electric power consumption of the blade motor 92 increases and decreases in proportion to workloads applied to the blades 91 connected to the blade motors 92. Therefore, the detection of the electric power consumption of the blade motors 92 by the controller 24a means the detection of workloads applied to the blades 91.

Herein, the electric power consumption threshold map is described with reference to FIG. 14.

In the electric power consumption threshold map, a threshold value PLS for the electric power consumption PL of the left blade motor 92L, and a threshold value PRS for the electric power consumption PR of the right blade motor 92R are set. The threshold value PLS and the threshold value PRS are set to values greater than electric power consumption (electric power shown by broken lines in FIG. 14) during the rotation of the blade motors 92 in a no-load state (state where the blades 91 are idled without performing lawn mowing work) by a predetermined ratio (or a predetermined value). Therefore, for example, in a case where the electric power consumption PL of the left blade motor 92L is greater than the threshold value PLS (is included in the region T of FIG. 14), it can be determined that the left blade 91L is in the course of lawn mowing work, and a high load is applied to the left blade motor 92L.

The threshold value PLS and the threshold value PRS are the same value in this embodiment, but can be set to respective different values.

Figure 14:
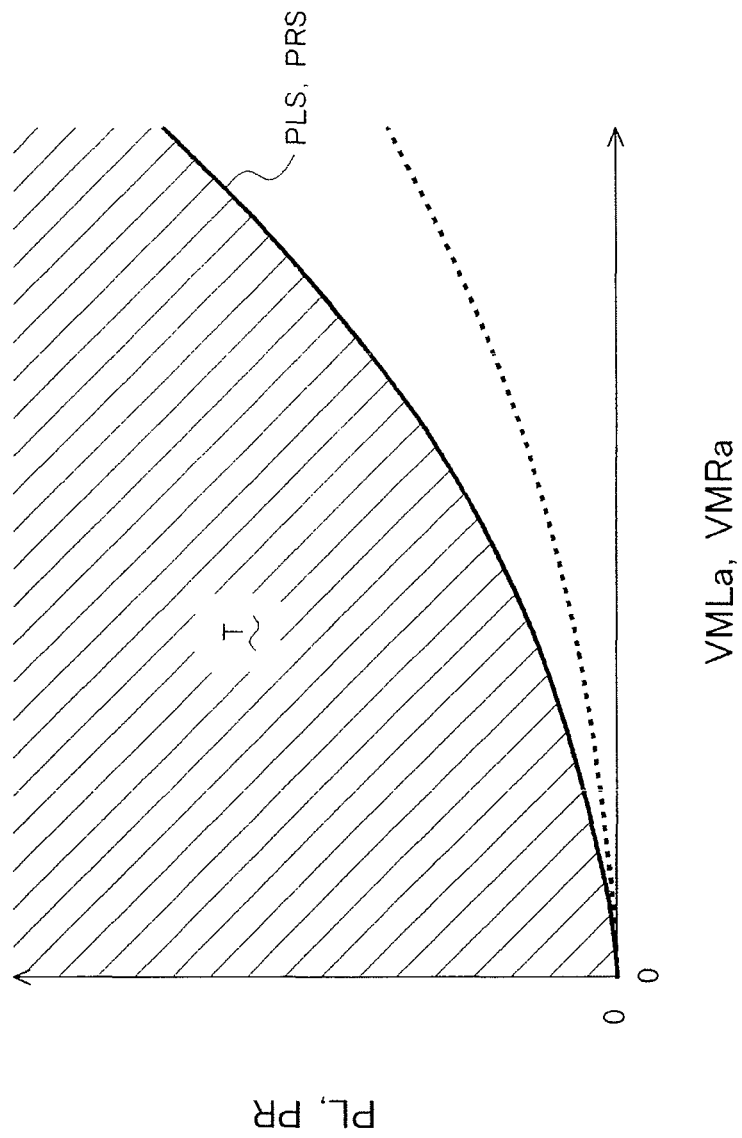
FIG. 14 is a diagram showing an electric power consumption threshold map.

The controller 24a determines by using the electric power consumption threshold map set as described above whether or not the electric power consumption PL of the left blade motor 92L is greater than the threshold value PLS for the current actual rotation number VMLa of the current left blade motor 92L (whether or not the electric power consumption PL is included in the region T of FIG. 14).

In a case where the controller 24a determines that the electric power consumption PL is greater than the threshold value PLS, the controller 24a advances to step S101 again.

In a case where the controller 24a determines that the electric power consumption PL is not greater than the threshold value PLS, the controller 24a advances to step S106.

In step S105, the controller 24a also determines whether or not the electric power consumption PR of the right blade motor 92R is greater than the threshold value PRS for the current actual rotation number VMRa of the right blade motor 92R.

In step S106 shown in FIG. 12, the controller 24a controls the operation of the left blade motor 92L such that the left blade motor 92L rotates at the target rotation number VML determined in step S103.

Similarly, the controller 24a controls the operation of the right blade motor 92R such that the right blade motor 92R rotates at the target rotation number VMR.

The controller 24a advances to step S101 again after performing the process in step S106.

The controller 24a performs the above energy-saving control (see FIG. 12), so that it is possible to improve energy saving performance. That is, the controller 24a increases and decreases the actual rotation number VMLa of the left blade motor 92L and the actual rotation number VMRa of the right blade motor 92R in accordance with increase and reduction in the speed VBL of the left blade 91L and the speed VBR of the right blade 91R, thereby enabling improvement in energy saving.

Figure 15:
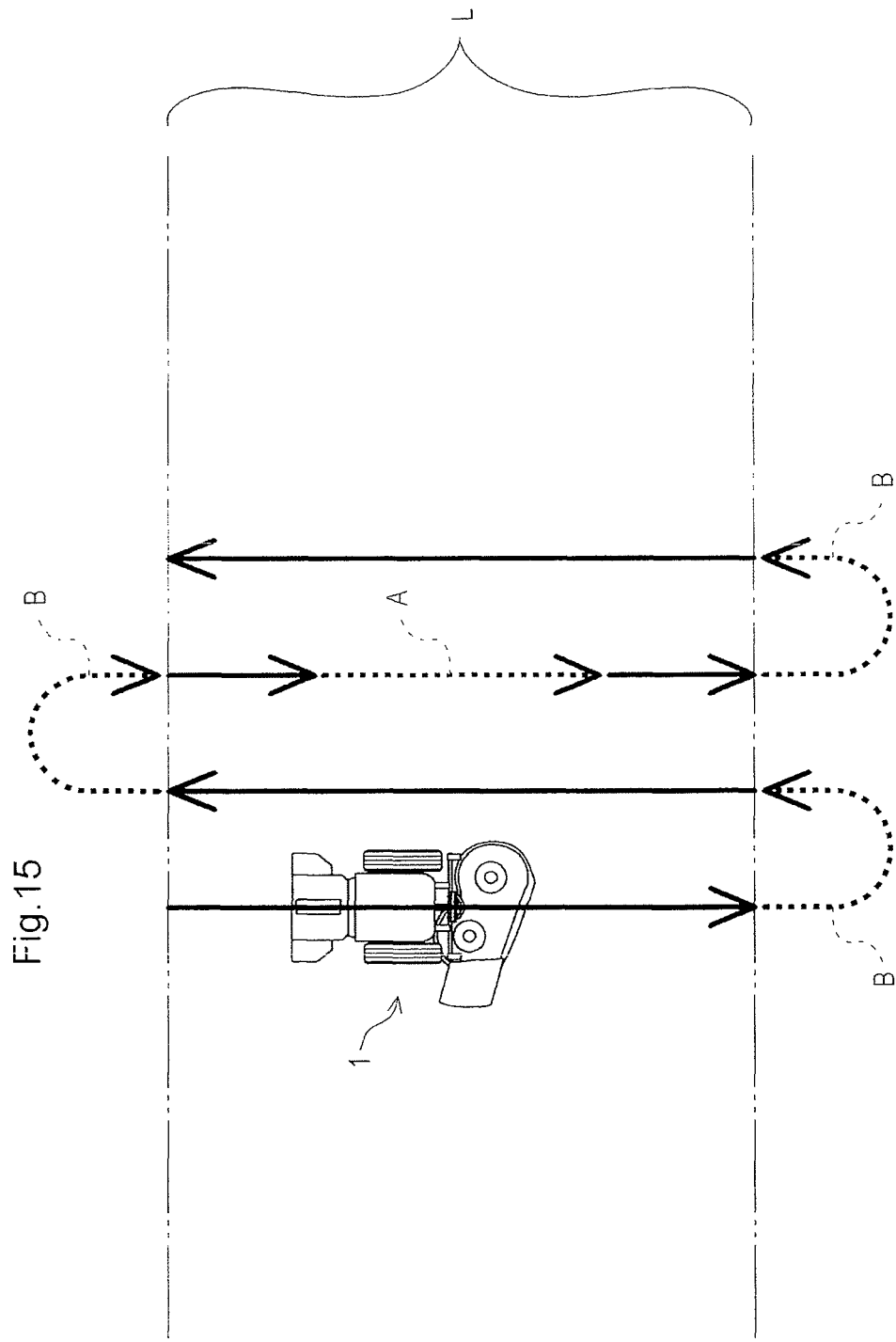
FIG. 15 is a schematic plan view showing a situation of lawn mowing work by the lawn mower.

For example, as shown in FIG. 15, in a case where the speed V of the lawn mower 1 (traveling machine body 10) is reduced (decelerated) when the lawn mower 1 performs lawn mowing work while reciprocating from one end to the other end of a region L, for which lawn mowing work is performed (a part shown by the broken line arrow A in FIG. 15), the speed VBL of the left blade 91L and the speed VBR of the right blade 91R are reduced. In this case, the controller 24a decreases the actual rotation number VMLa of the left blade motor 92L and the actual rotation number VMRa of the right blade motor 92R to achieve energy saving.

Additionally, in a case where the lawn mower 1 turns (parts shown by the broken line arrows B in FIG. 15), the lawn mower 1 is generally decelerated, and therefore the speed VBL of the left blade 91L and the speed VBR of the right blade 91R are reduced. Also in this case, the controller 24a decreases the actual rotation number VMLa of the left blade motor 92L and the actual rotation number VMRa of the right blade motor 92R to achieve energy saving.

Figure 16:
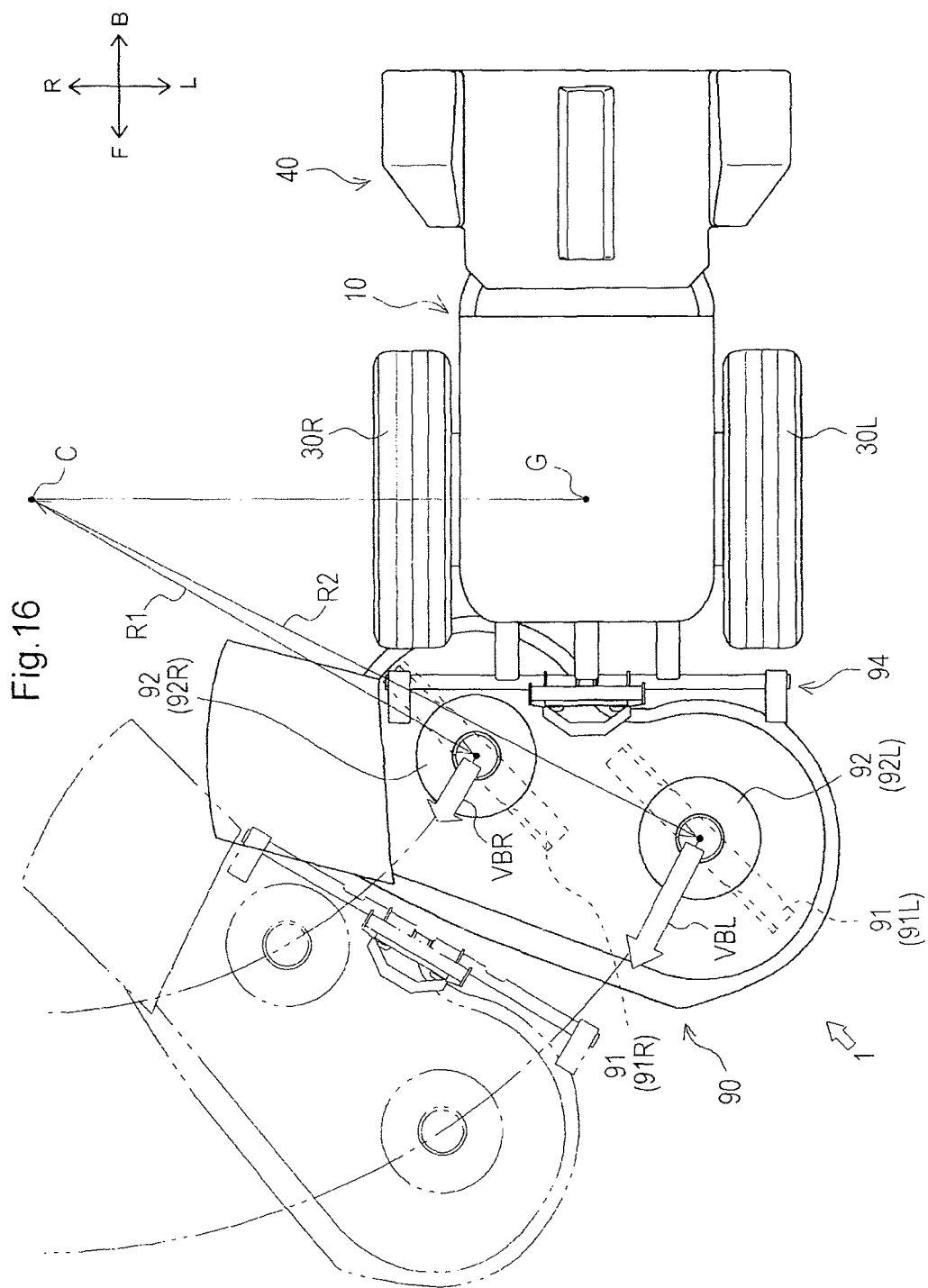
FIG. 16 is a schematic plan view showing a difference between the speeds of blades when the lawn mower is turned.

Furthermore, in a case where the lawn mower 1 turns, the speed of the blade 91 located on the inner side is smaller than the speed of the blade 91 located on the outer side due to a difference between the turning radii. For example, in a case where the lawn mower 1 turns right as shown in FIG. 16, a distance (turning radius) R1 from the turning center C of the lawn mower 1 (traveling machine body 10) to the center of the right blade 91R is smaller than a distance (turning radius) R2 from the turning center C to the center of the left blade 91L. Therefore, the speed VBR of the right blade 91R is smaller than the speed VBL of the left blade 91L.

The controller 24a individually decreases the actual rotation number VMLa of the left blade motor 92L and the actual rotation number VMRa of the right blade motor 92R based on the speed VBL of the left blade 91L and the speed VBR of the right blade 91R, respectively. Therefore, the actual rotation number of the inner blade motor 92 (right blade motor 92R in FIG. 16) can be made smaller than the actual rotation number of the outer blade motor 92 (left blade motor 92L in FIG. 16). Thus, the actual rotation numbers of the blade motors 92 are individually controlled in accordance with the respective speeds of the blades 91, so that it is possible to more effectively achieve energy saving.

Thus, the controller 24a performs energy-saving control, so that it is possible to reduce electric power consumed by the blade motors 92. Accompanying this, it is possible to achieve extension of moving time of the lawn mower 1, and reduction in size and cost with reduction in the loadage of the battery 21. In particular, the lawn mower 1 for performing lawn mowing work often performs work while reciprocating, and therefore have many opportunities of deceleration for checking the surroundings, or turning, and a large energy saving effect by the energy-saving control can be expected. Additionally, it is possible to reduce noise with reduction in the rotation numbers of the blade motors 92 in the energy-saving control.

Even in a case where the speeds of the blades 91 are reduced, when the electric power consumption of the blade motors 92 is greater than a predetermined threshold value, the controller 24a determines that high loads are applied to the blades 91 (lawn mowing work is being performed), and does not perform control of decreasing the rotation numbers of the blade motors 92. Consequently, even during the energy-saving control, in a case where workloads are high, the rotation numbers of the blade motors 92 are prevented from decreasing, and active lawn mowing work is performed, so that it is possible to prevent deterioration in the accuracy of the lawn mowing work (such as occurrence of grass which is left long).

The vehicle body configuration of the lawn mower 1 shown in this embodiment is an example, and the disclosure is not limited to the lawn mower 1.

For example, the lawn mower 1 may be configured such that the left motor 22L and the right motor 22R are used as power sources for driving the pair of left and right driving wheels (the driving wheel 30L and the driving wheel 30R), but may be configured such that other power source (such as an engine) is used. Additionally, the lawn mower 1 may be configured such that the respective motors (the left motor 22L, the right motor 22R, and the blade motors 92) are driven by using electric power generated by the power of an engine.

Although the lawn mower 1 has the pair of left and right driving wheels, but the number of driving wheels, or the number of other wheels is not limited. For example, the lawn mower 1 may be capable of four-wheel drive like a work vehicle such as a general tractor.

Although the lawn mower 1 is driven based on the weight shift of a worker riding on the riding part 40, and the swing operation of the handle 70 by the worker, the lawn mower may be driven by other driving method (such as a driving method using a pedal for increasing and reducing the speed of the lawn mower 1).

Although the mower unit 90 is provided in the front part of the traveling machine body 10, the configuration of the mower unit 90 is not limited to this. The mower unit 90 can be provided on the back part or the lower part of the traveling machine body 10.

In this embodiment, the blade motors 92 (working motors) using electric power are used as power devices according to the disclosure. However, the disclosure is not limited to this. For example, transmissions (such as a HST (hydrostatic continuously variable transmission)) provided to correspond to an engine and the respective blades 91 and capable of properly changing the power of the engine and transmitting the changed power to the blades 91 can be used.

In this embodiment, the power devices (blade motors 92) are provided in the mower unit 90. However, the disclosure is not limited to this. For example, power devices are provided in the traveling machine body 10, and rotational power from the power devices can be properly transmitted to the blades 91 of the mower unit 90.

In this embodiment, the two blades 91 are provided. However, the disclosure is not limited to this, and the number of the blades 91 is not limited.

In this embodiment, the controller 24a detects the speeds of the blades 91 based on the speed V and the angular speed ω of the traveling machine body 10 to the ground. However, the disclosure is not limited to this. For example, the speeds of the blades 91 can be detected by using various sensors (such as a ground speed sensor).

In this embodiment, the controller 24a detects the speed V and the angular speed ω of the traveling machine body 10 based on the pair of left and right driving wheels. However, the disclosure is not limited to this. For example, the speed V and the angular speed ω can be detected by using various sensors (such as a ground speed sensor and a gyro sensor).

Figure 17A:
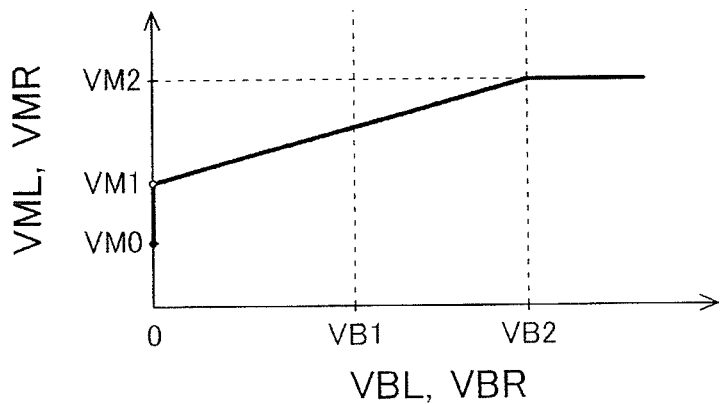
FIGS. 17A, 17B and 17C are diagrams showing other examples of the rotation number map.
Figure 17B:
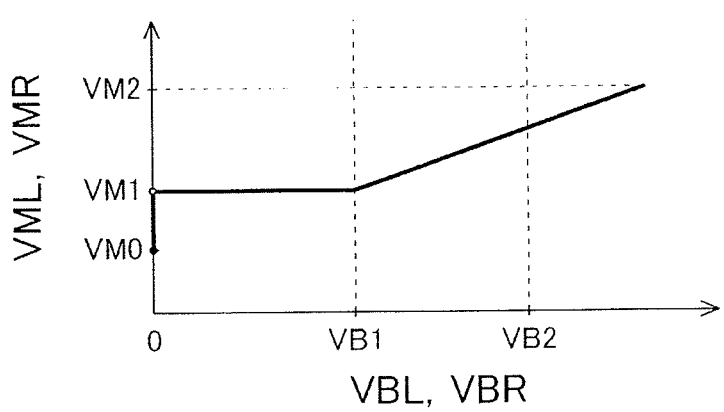
Figure 17C:
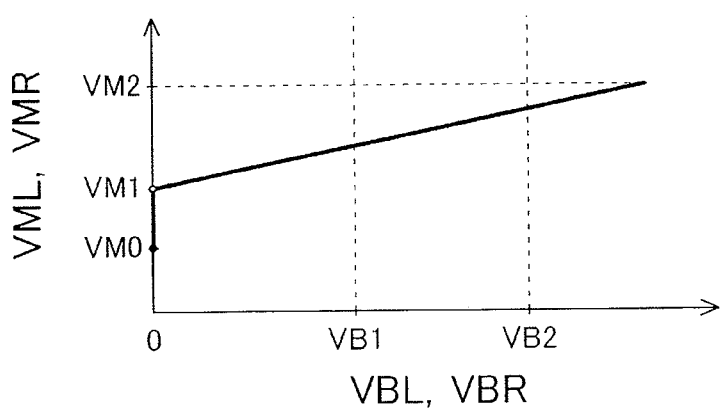

The rotation number map (see FIG. 13) and the electric power consumption threshold map (see FIG. 14) exemplified in this embodiment are examples, and the contents thereof can be optionally set. For example, FIGS. 17A to 17C each show another example of setting a rotation number map. FIG. 17A shows an example of setting such that the target rotation number VML increases and decreases within a range of 0<VBL≤VB2 with increase and reduction in the speed VBL of the left blade 91L. FIG. 17B shows an example of setting such that the target rotation number VML increases and decreases within a range of VB1<VBL with increase and reduction in the speed VBL of the left blade 91L. FIG. 17C shows an example of setting such that the target rotation number VML increases and decreases within a range of 0<VBL with increase and reduction in the speed VBL of the left blade 91L.

The values of the target rotation numbers of the blade motors 92 (the target rotation number VML and the target rotation number VMR) in the rotation number map are desirably set to appropriate values in accordance with the diameters of the blades 91.

The lawn mower 1 may be provided with a notification unit (such as a liquid crystal monitor and a buzzer) for notifying a worker of a currently selected control among the non-energy-saving control and the energy-saving control.

The invention claimed is:

1. A lawn mower comprising:
a traveling vehicle body;
drive wheels mounted to the traveling vehicle body;
a work device having a plurality of blades for performing lawn mowing work, the plurality of blades rotating inside a mower deck and being driven by rotational power supplied by separate blade motors mounted to an upper surface of the mower deck;
a blade speed detection unit configured to detect respective speeds of the plurality of blades relative to a ground;
a drive wheel speed detecting unit configured to detect a speed of the drive wheels; and
a control device controlling the separate blade motors so that they operate in either a non-energy-saving control mode or an energy-saving control mode, said blades rotating at a lower speed in the energy-saving control mode than in the non-energy-saving control mode, wherein an angular speed of the traveling vehicle body is calculated by the control device based on the detected speed from the drive wheel speed detecting unit,
wherein, during the energy-saving control mode, the separate blade motors are controlled individually so that the plurality of blades rotate about vertical axes at different speeds and achieve reduced power consumption during turning movement of the lawn mower based on the angular speed of the traveling vehicle body.

2. The lawn mower as claimed in claim 1, wherein the control device does not decrease the speed of the blades, in a case where a workload applied to each of the blades is higher than a predetermined threshold value during the energy-saving control mode.

3. The lawn mower as claimed in claim 2, wherein in the non-energy-saving control mode, each of the blades rotate at a constant speed.

4. The lawn mower as claimed in claim 3, further comprising
a selection unit configured to select any one of the energy-saving control mode and the non-energy-saving control mode.

5. The lawn mower as claimed in claim 1, wherein the control device is located on the traveling vehicle body having a battery, drive motors powered by the battery, and wherein the work device is movably coupled to the traveling vehicle body.

6. The lawn mower as claimed in claim 1, further comprising an operator controlled change-over switch allowing an operator to switch between the non-energy-saving control mode and the energy-saving control mode.

7. The lawn mower as claimed in claim 1, wherein, in the non-energy-saving mode, all of the blades are rotated at either:
a predetermined rotation number;
a maximum rotation number; or
a constant rotation number.

8. The lawn mower as claimed in claim 1, wherein, in the energy-saving mode, the blades are rotated at speeds which are based on a rotation number map.

9. A lawn mower comprising:
a traveling vehicle body;
drive wheels mounted to the traveling vehicle body;
a mower unit coupled to the traveling vehicle body and comprising blade motors mounted to a common mower deck;
each blade motor rotating a blade for performing lawn mowing work;
each blade being located within the common mower deck of the mower unit;
a blade speed detection unit; a drive wheel speed detecting unit configured to detect a speed of the drive wheels; and
a control device controlling, during turning movement of the lawn mower, the blade motors so that they operate in either a non-energy-saving control mode or an energy-saving control mode, said blades rotating at a lower speed in the energy-saving control mode than in the non-energy-saving control mode, wherein an angular speed of the traveling vehicle body is calculated or detected by the control device based on the detected speed from the drive wheel speed detecting unit,
wherein, during the energy-saving control mode, the blade motors operate with different rotation speeds and power consumption based on the angular speed of the traveling vehicle body.

10. The lawn mower as claimed in claim 9, wherein the control device does not decrease the speed of the blades, in a case where a workload applied to each of the blades is higher than a predetermined threshold value during the energy-saving control mode.

11. The lawn mower as claimed in claim 10, wherein the control device is capable of performing the non-energy-saving control mode regardless of the speeds of the plurality of blades relative to the ground.

12. The lawn mower as claimed in claim 9, wherein the control device is located on the traveling vehicle body having a battery, drive motors powered by the battery, and wherein the mower unit is movably coupled to the traveling vehicle body.

13. A lawn mower comprising:
a traveling vehicle body;
left and right wheel motors driving left and right drive wheels;

a mower unit coupled to a front side of the traveling vehicle body and comprising blade motors and wheels;

each blade motor being mounted to a common mower deck, having a vertical rotation axis, and rotating a blade for performing lawn mowing work;

each blade being located within the common mower deck of the mower unit and rotating about vertical axes;

a blade speed detection unit;

a drive wheel speed detecting unit configured to detect a speed of the left and right drive wheels; and a control device controlling the blade motors so that they operate in either a non-energy-saving control mode or an energy-saving control mode, said blades rotating at a lower speed in the energy-saving control mode than in the non-energy-saving control mode, wherein an angular speed of the traveling vehicle body is calculated by the control device based on the detected speeds of the left and right drive wheels; and wherein, during the energy-saving control mode, the blade motors operate with different rotation speeds and power consumption based on the angular speed of the traveling vehicle body.

14. The lawn mower as claimed in claim 13, further comprising an operator platform; and an operator grip handle.

15. The lawn mower as claimed in claim 13, wherein the control device is located on the traveling vehicle body having a battery, drive motors powered by the battery, and wherein the mower unit is movably coupled to the traveling vehicle body.

* * * * *